United States Patent
Kitazato

(10) Patent No.: US 10,305,617 B2
(45) Date of Patent: May 28, 2019

(54) TRANSMISSION APPARATUS, TRANSMISSION METHOD, RECEPTION APPARATUS, AND RECEPTION METHOD

(71) Applicant: SONY CORPORATION, Tokyo (JP)

(72) Inventor: Naohisa Kitazato, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/546,676

(22) PCT Filed: Jan. 29, 2016

(86) PCT No.: PCT/JP2016/052629
§ 371 (c)(1),
(2) Date: Jul. 27, 2017

(87) PCT Pub. No.: WO2016/129413
PCT Pub. Date: Aug. 18, 2016

(65) Prior Publication Data
US 2018/0034571 A1     Feb. 1, 2018

(30) Foreign Application Priority Data
Feb. 10, 2015   (JP) ................. 2015-024603

(51) Int. Cl.
*H04J 3/06* (2006.01)
*H04H 60/40* (2008.01)
(Continued)

(52) U.S. Cl.
CPC ........ *H04J 3/0667* (2013.01); *H04H 60/40* (2013.01); *H04J 3/0664* (2013.01);
(Continued)

(58) Field of Classification Search
None
See application file for complete search history.

(56) References Cited

U.S. PATENT DOCUMENTS

| | | |
|---|---|---|
| 2009/0310593 A1 | 12/2009 | Sheynblat et al. |
| 2014/0282791 A1* | 9/2014 | Schmidt ............ H04N 21/8547 725/116 |
| 2017/0257647 A1* | 9/2017 | Iguchi ................ H04N 21/231 |

FOREIGN PATENT DOCUMENTS

| | | |
|---|---|---|
| EP | 2 479 624 A2 | 7/2012 |
| JP | 2004-32630 A | 1/2004 |

(Continued)

OTHER PUBLICATIONS

Kyungmo Park, et al., "Study of ISO/IEC CD 23008-1 MPEG Media Transport," MPEG-H System, International Organization for Standardarization Organisation Internationale De Normalisation ISO/IEC JTC1/SC29/WG11 Coding of Moving Pictures and Audio, MPEG/N13089, Oct. 2012, (124 pages).

(Continued)

*Primary Examiner* — Mohammad S Adhami
(74) *Attorney, Agent, or Firm* — Oblon, McClelland, Maier & Neustadt, L.L.P.

(57) ABSTRACT

A time information generating unit generates absolute time information synchronized with absolute time information acquired from an external source. The time information generating unit generates time information by shifting, to shifted time, occurrence time of a leap second that can be represented by the absolute time information acquired from the external source. A transmission unit transmits a signal including transmission media and the absolute time information generated by the time information generating unit. Thereby, influence on a reception side by occurrence of a leap second is suppressed.

8 Claims, 35 Drawing Sheets

(51) Int. Cl.
*H04N 21/43* (2011.01)
*H04L 12/18* (2006.01)
*H04W 56/00* (2009.01)

(52) U.S. Cl.
CPC ..... *H04L 12/1881* (2013.01); *H04N 21/4302* (2013.01); *H04W 56/0015* (2013.01)

(56) References Cited

FOREIGN PATENT DOCUMENTS

| | | |
|---|---|---|
| JP | 2010-272071 A | 12/2010 |
| JP | 2011-524725 A | 9/2011 |

OTHER PUBLICATIONS

International Search Report dated Apr. 5, 2016 in PCT/JP2016/052629 filed Jan. 29, 2016.
Extended European Search Report dated Dec. 4, 2018 in corr. European Patent Application No. 16749057.2, filed Jan. 29, 2016 12 pp.

\* cited by examiner

10

CLOCK SYNCHRONIZATION AND PRESENTATION SYNCHRONIZATION

PROTOCOL STACK OF MMT SYSTEM

CONFIGURATION OF MMT SYSTEM BROADCASTING STREAM

FIG. 6
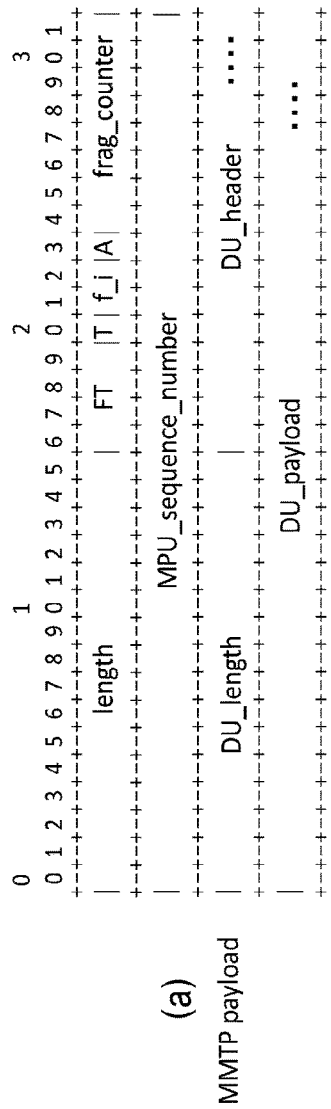
(a)
MMTP payload
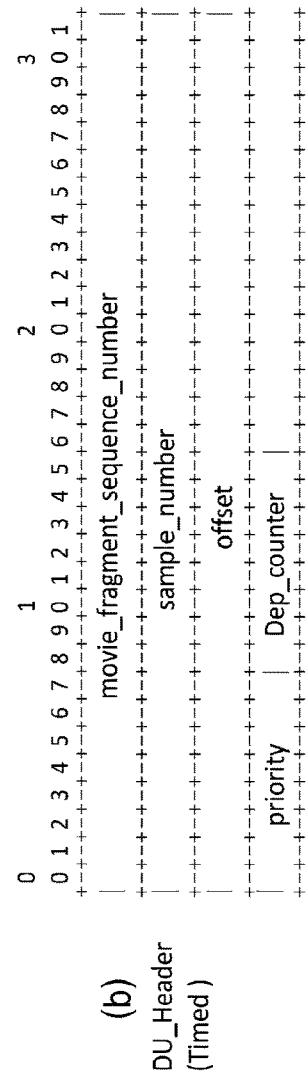
(b)
DU_Header
(Timed)

FIG. 9

DESCRIPTION OF parameters IN PA Message

| ITEM | ITEM NAME IN JAPANESE | DESCRIPTION |
|---|---|---|
| message_id | MESSAGE ID | FIXED VALUE FOR DISCRIMINATING PA message IN VARIOUS SIGNALING INFORMATION. |
| version | VERSION | REPRESENT VERSION OF PA Message. INTEGER VALUE OF EIGHT bits. INCREMENT BY ONE WHEN PART OF PARAMETERS FORMING MPT IS UPDATED. |
| length | LENGTH | NUMBER OF BYTES IN PA Message. COUNT IMMEDIATELY AFTER THIS FIELD. |

FIG. 10

DESCRIPTION OF parameters IN MP table

| ITEM | ITEM NAME IN JAPANESE | DESCRIPTION |
|---|---|---|
| table_id | TABLE ID | FIXED VALUE FOR IDENTIFYING MP table IN VARIOUS SIGNALING INFORMATION |
| version | VERSION | REPRESENT VERSION OF MPT. INTEGER VALUE OF EIGHT bits. INCREMENT BY ONE WHEN PART OF PARAMETERS FORMING MPT IS UPDATED. |
| length | LENGTH | NUMBER OF BYTES IN MP table. COUNT IMMEDIATELY AFTER THIS FIELD. |
| Package_id | PACKAGE ID | IDENTIFICATION INFORMATION OF ENTIRE PACKAGE INCLUDING, AS COMPONENTS, ALL OF SIGNALS AND FILES TRANSMITTED BY BROADCASTING SIGNALS. |
| MPT_descriptors | MPT DESCRIPTOR AREA | STORAGE AREA FOR DESCRIPTORS RELATED TO ENTIRE PACKAGE. ASSUME THAT ONE OR MORE DESCRIPTORS ARE ARRANGED AFTER SPECIFYING DESCRIPTORS HAVING VARIOUS OBJECTS. |
| Number_of_assets | NUMBER OF ASSETS | NUMBER OF SIGNALS (ASSETS) AS ELEMENTS FORMING PACKAGE. SAME NUMBER OF FOLLOWING ASSET LOOPS ARE ARRANGED. |
| Asset_id | ASSET ID | ID UNIQUELY IDENTIFYING ASSET |
| gen_loc_info | GENERAL LOCATION INFORMATION | REPRESENT LOCATION OF DESTINATION OF ASSET |
| Asset_descriptors | Asset DESCRIPTOR AREA | STORAGE AREA FOR DESCRIPTORS RELATED TO ASSET ASSUME THAT ONE OR MORE DESCRIPTORS ARE ARRANGED AFTER SPECIFYING DESCRIPTORS HAVING VARIOUS OBJECTS. |

FIG. 11

MPU TIMESTAMP DESCRIPTOR

| Syntax | No. of Bits | Format |
|---|---|---|
| MPU_Timestamp_Descriptor ( ) { | | |
| descriptor_tag | 16 | uimsbf |
| descriptor_length | 8 | uimsbf |
| for (i=0; i<N; i++) { | | |
| mpu_sequence_number | 32 | uimsbf |
| mpu_presentation_time | 64 | uimsbf |
| } | | |
| } | | |

FIG. 13

MPU EXTENDED TIMESTAMP DESCRIPTOR

| Syntax | No. of Bits | Format |
|---|---|---|
| MPU_Extended_Timestamp_Descriptor(){ | | |
| descriptor_tag | 16 | uimsbf |
| descriptor_length | 8 | uimsbf |
| reserved | 5 | bslbf |
| pts_offset_type | 2 | uimsbf |
| timescale_flag | 1 | bslbf |
| if (timescale_flag == 1) { | | |
|    timescale | 32 | uimsbf |
| } | | |
| if (pts_offset_type == 1) { | | |
|    default_pts_offset | 16 | uimsbf |
| } | | |
| for(i=0 ; i<N ; i++){ | | |
|    mpu_sequence_number | 32 | uimsbf |
|    mpu_decoding_time_offset | 16 | uimsbf |
|    num_of_au | 8 | uimsbf |
|    for(j=0 ; j<num_of_au ; j++){ | | |
|       dts_pts_offset | 16 | uimsbf |
|       if (pts_offset_type == 2) { | | |
|          pts_offset | 16 | uimsbf |
|       } | | |
|    } | | |
| } | | |

(a)

(b)

Where pts_offset_type=0/1
$DT_k = mpt + ((k-1)*ptso - mdto)*2^N/ts$

Where pts_offset_type=2
$DT_k = mpt + (\Sigma ptsoi - mdto)*2^N/ts$ $PT_k = DT_k + dptok*2^N/ts$

DELAY ADJUSTMENT OF MPT AND AV ENCODED DATA

FIG. 17

NETWORK TIME PROTOCOL DATA

| Syntax | No. of Bits | Format |
|---|---|---|
| Network_Time_Protocol_Data ( ) { | | |
| leap_indicator | 2 | uimsbf |
| version | 3 | uimsbf |
| mode | 3 | uimsbf |
| stratum | 8 | uimsbf |
| poll | 8 | uimsbf |
| precision | 8 | uimsbf |
| root_delay | 32 | uimsbf |
| root_dispersion | 32 | uimsbf |
| reference_identification | 32 | uimsbf |
| reference_timestamp | 64 | uimsbf |
| origin_timestamp | 64 | uimsbf |
| receive_timestamp | 64 | uimsbf |
| transmit_timestamp | 64 | uimsbf |
| } | | |

| LEAP SECOND DIRECTIVE | MEANING |
|---|---|
| 0 | NO WARNING |
| 1 | LAST MINUTE INCLUDES 61 SECONDS |
| 2 | LAST MINUTE INCLUDES 59 SECONDS |
| 3 | WARNING |

(b)

| OPERATION MODE | MEANING |
|---|---|
| 0 | reserved |
| 1 | CURRENT ACTIVE MODE |
| 2 | CURRENT PASSIVE MODE |
| 3 | CLIENT |
| 4 | SERVER |
| 5 | BROADCAST |
| 6 | NTP CONTROL MESSAGE |
| 7 | reserved for private use (BROADCAST LEAP SECOND SHIFT) |

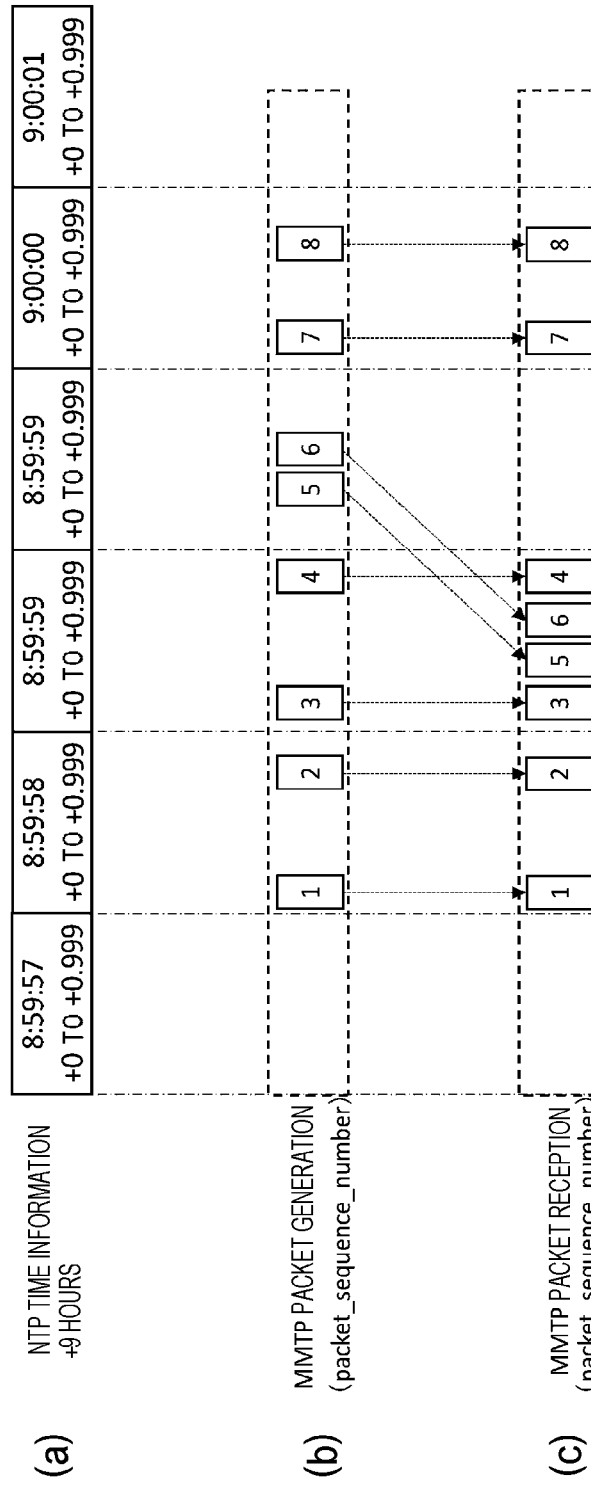

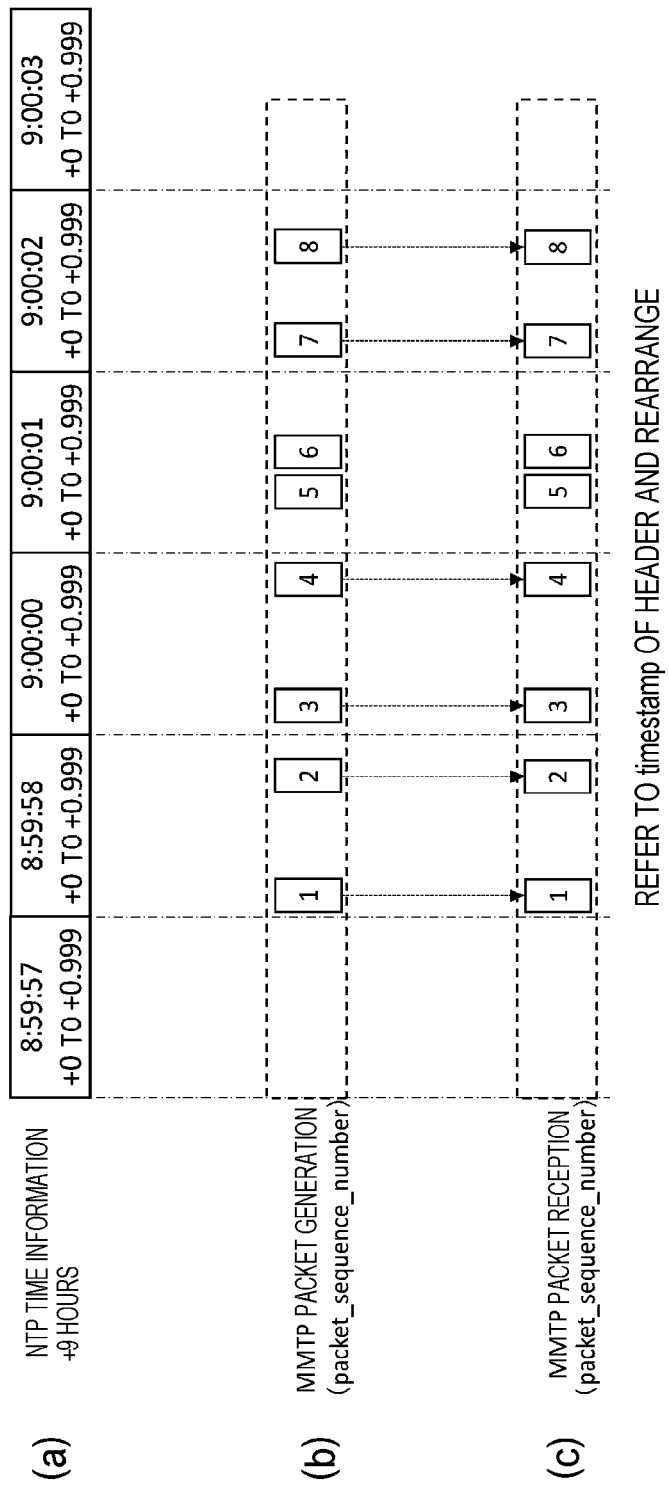

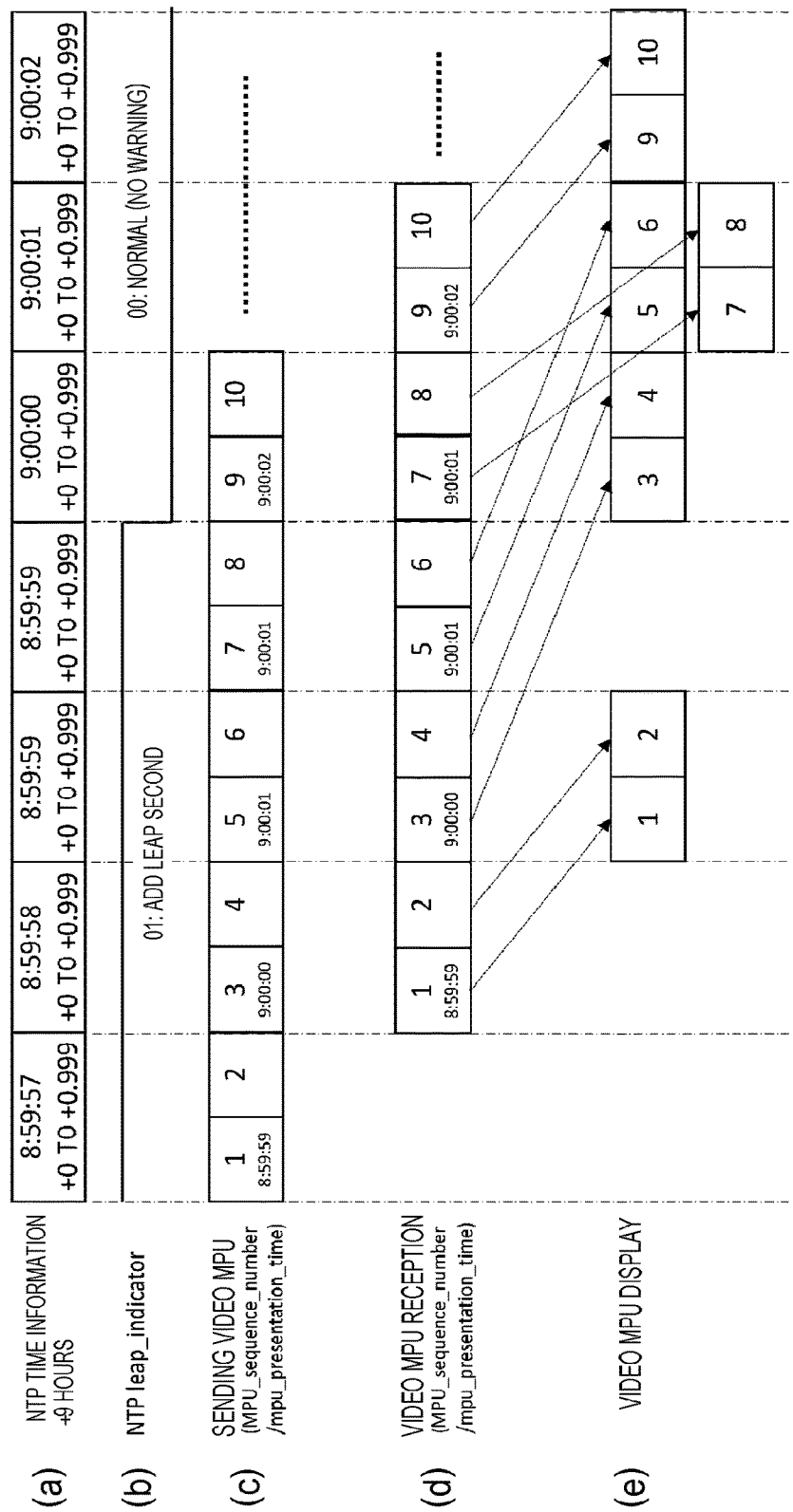

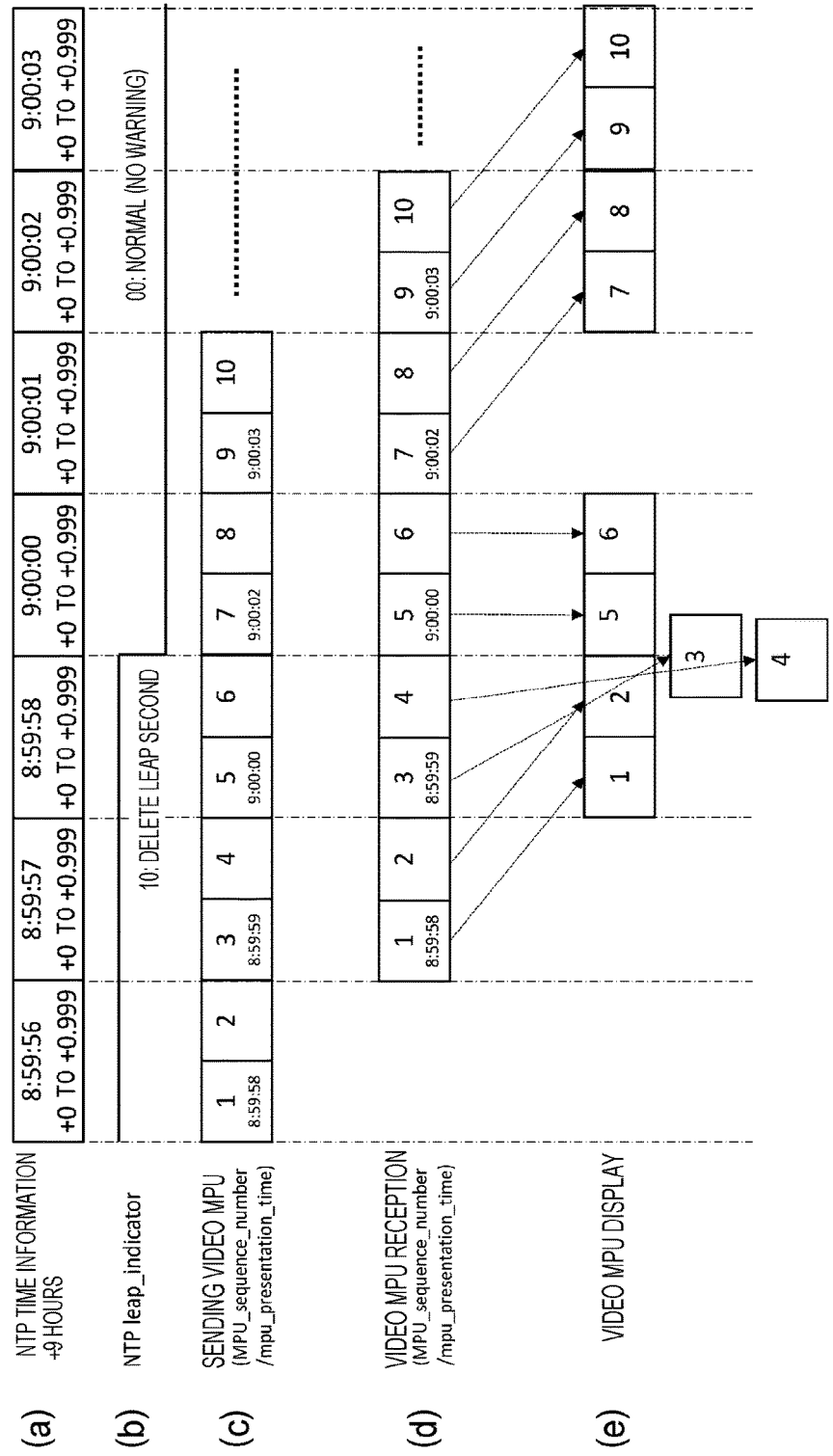

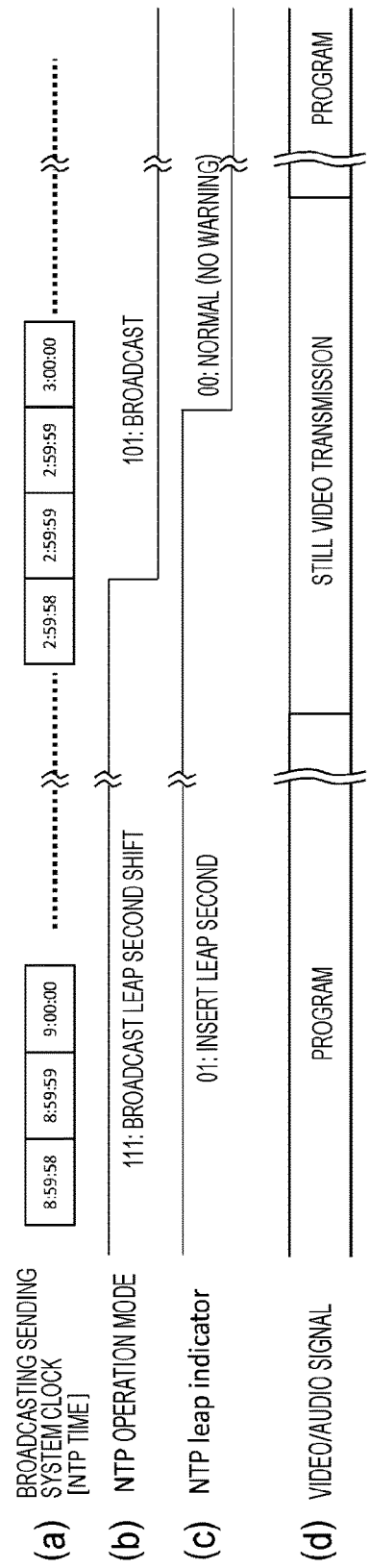

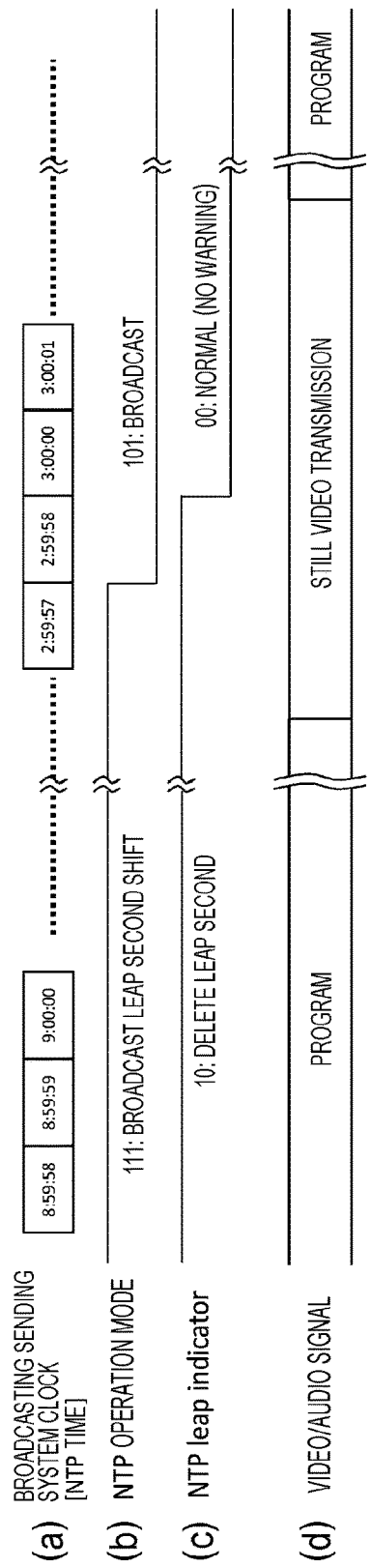

FIG. 25

MPU EXTENDED TIMESTAMP DESCRIPTOR

| Syntax | No. of Bits | Format |
|---|---|---|
| MPU_Extended_Timestamp_Descriptor(){ | | |
| descriptor_tag | 16 | uimsbf |
| descriptor_length | 8 | uimsbf |
| leap_control | 3 | bslbf |
| reserved | 2 | bslbf |
| pts_offset_type | 2 | uimsbf |
| timescale_flag | 1 | bslbf |
| if (timescale_flag == 1) { | | |
|    timescale | 32 | uimsbf |
| } | | |
| if (pts_offset_type == 1) { | | |
|    default_pts_offset | 16 | uimsbf |
| } | | |
| for(i=0 ; i<N ; i++){ | | |
|    mpu_sequence_number | 32 | uimsbf |
|    mpu_decoding_time_offset | 16 | uimsbf |
|    num_of_au | 8 | uimsbf |
|    for(j=0 ; j<num_of_au ; j++){ | | |
|       dts_pts_offset | 16 | uimsbf |
|       if (pts_offset_type == 2) { | | |
|          pts_offset | 16 | uimsbf |
|       } | | |
|    } | | |
| } | | |

FIG. 26

| b2 | b1b0 | |
|---|---|---|
| 0<br>timestamp BASED ON CLOCK OTHER THAN RECEPTION NTP | 00 | -(NOT APPLICABLE) |
| | 01 | timestamp BASED ON CLOCK ADVANCED BY ONE SECOND AS COMPARED TO RECEPTION NTP |
| | 10 | timestamp BASED ON CLOCK DELAYED BY ONE SECOND AS COMPARED TO RECEPTION NTP |
| | 11 | timestamp BASED ON CLOCK SYNCHRONIZED WITH RECEPTION NTP |
| 1<br>timestamp BASED ON CLOCK BY RECEPTION NTP | 00 | -(NOT APPLICABLE) |
| | 01 | MPU SET WITH PTS ON BASIS OF TIME WHEN LEAP SECOND IS INSERTED |
| | 10 | MPU SET WITH PTS ON BASIS OF TIME WHEN LEAP SECOND IS DELETED |
| | 11 | NORMAL MPU |

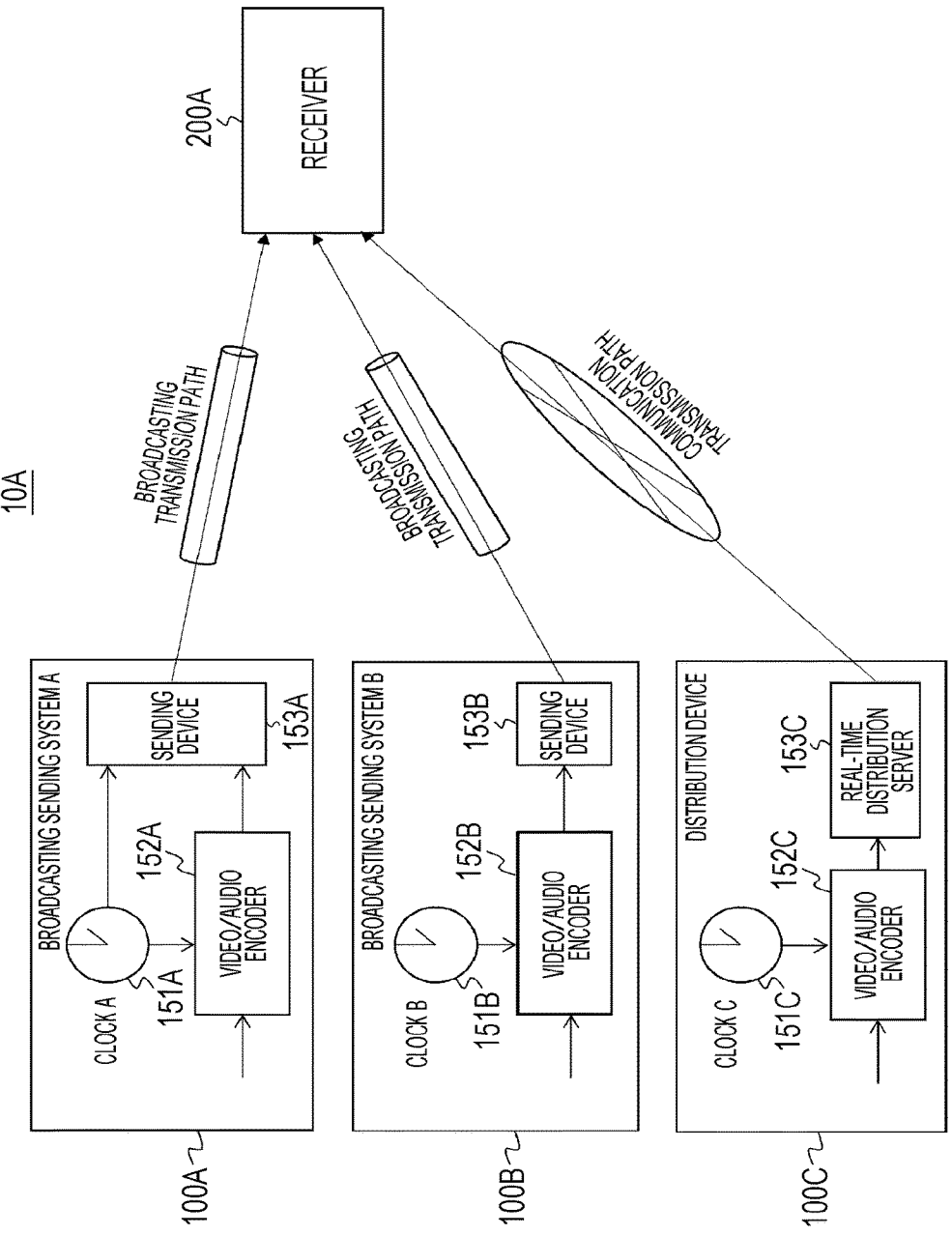

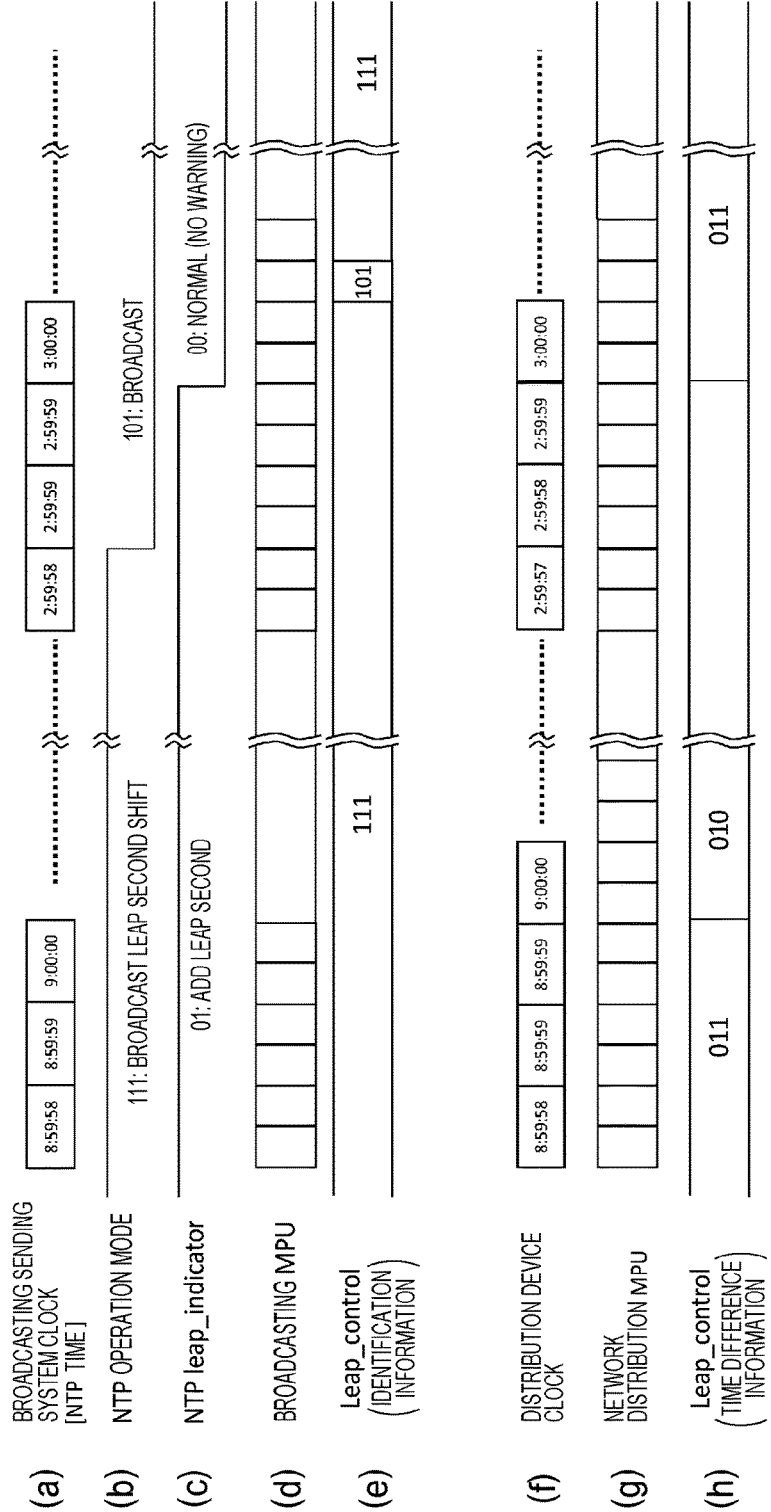

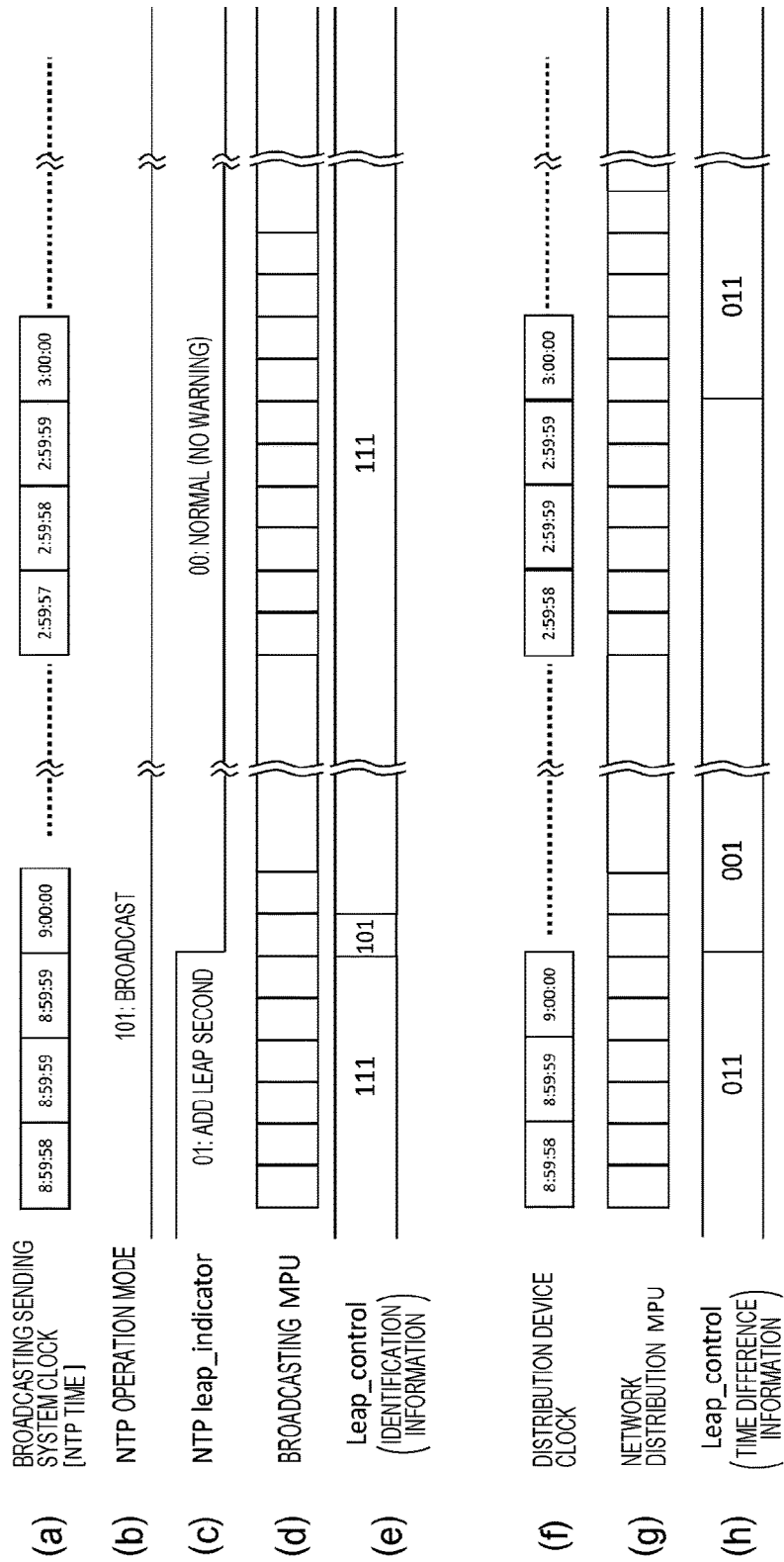

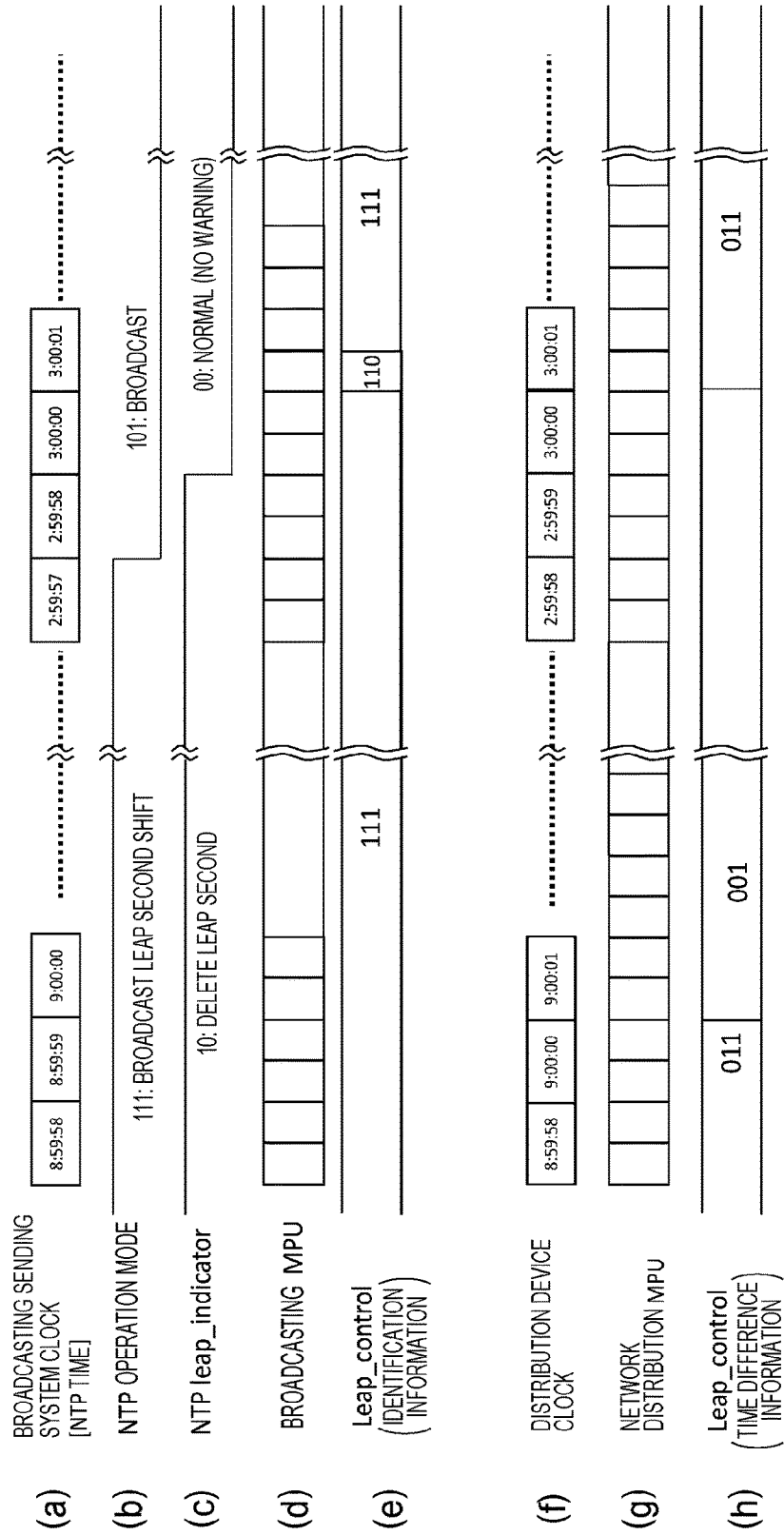

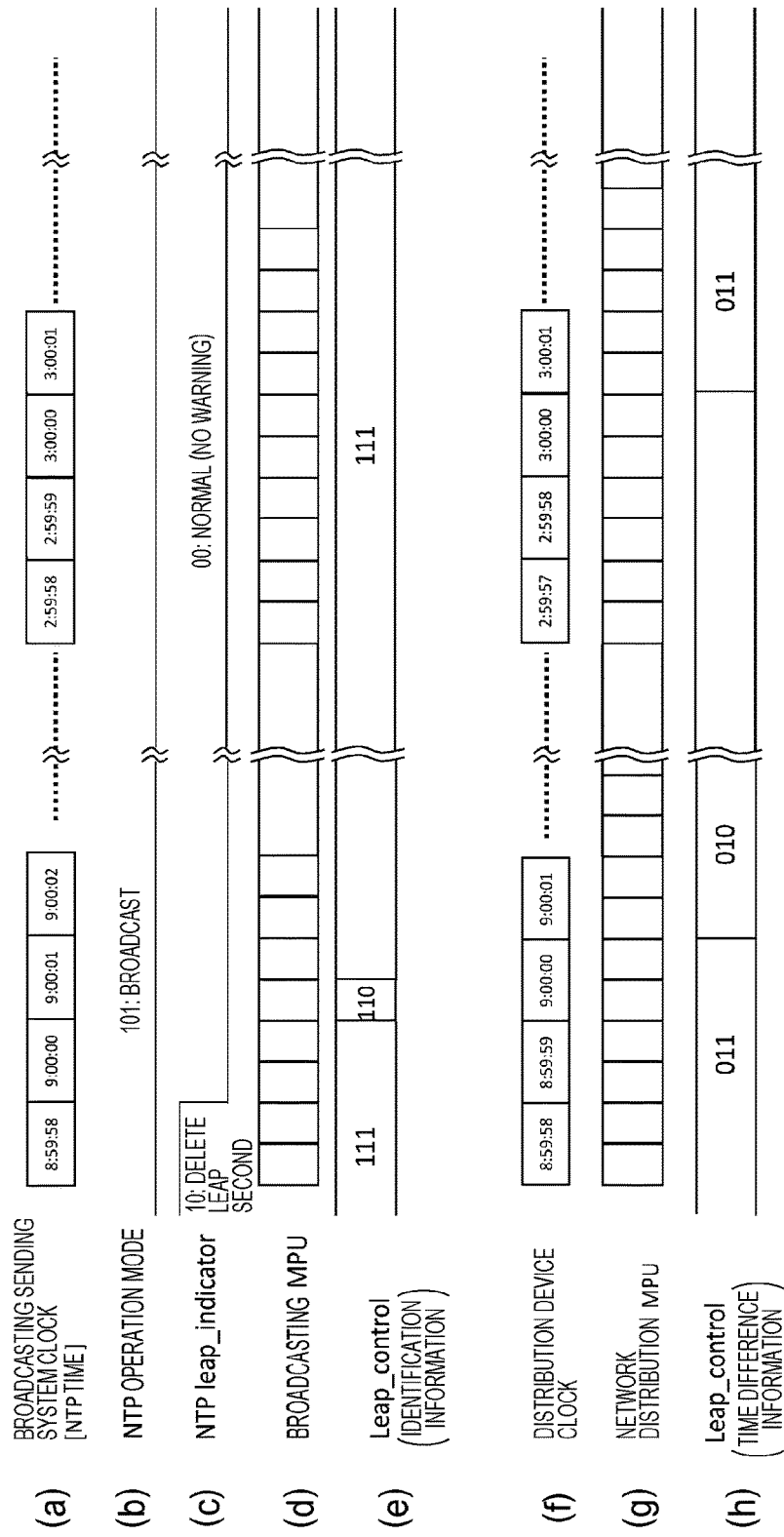

TRANSMISSION APPARATUS, TRANSMISSION METHOD, RECEPTION APPARATUS, AND RECEPTION METHOD

TECHNICAL FIELD

The present technology relates to a transmission apparatus, a transmission method, a reception apparatus, and a reception method and especially to a transmission apparatus for transmitting a signal of the IP system including transmission media such as video and audio, a transmission method, a reception apparatus, and a reception method.

BACKGROUND ART

As a next-generation broadcasting system, transmission systems for transmitting by a content format based on MP4 ISO base media file format based on IP protocols, such as MMT, are under review (e.g. see Non Patent Document 1). In a case where absolute time (UTC) is employed as a reference time axis for presentation synchronization, a leap second that occurs once in several years is a problem in presentation control.

CITATION LIST

Non Patent Document

Non Patent Document 1: Study of ISO/IEC CD 23008-1 MPEG Media Transport, [online], retrieved on May 7, 2013, the Internet<URL: http://mpeg.chiariglione.org/standards/mpeg-h/mpeg-media-transport>

SUMMARY OF THE INVENTION

Problems to be Solved by the Invention

An object of the present technology is to suppress influence on a reception side by occurrence of a leap second.

Solutions to Problems

A concept of the present technology resides in a transmission apparatus including a time information generating unit which generates absolute time information synchronized with absolute time information acquired from an external source. The time information generating unit generates time information by shifting, to shifted time, occurrence time of a leap second that can be represented by the absolute time information acquired from the external source. The transmission apparatus further includes a transmission unit which transmits a signal including transmission media and the absolute time information generated by the time information generating unit.

In the present technology, absolute time information acquired from an external source is referred to in the time information generating unit. For example, absolute time information is acquired in a Network Time Protocol (NTP) long format from an NTP server by the NTP or from another device by the IEEE1588PTP.

In the time information generating unit, absolute time information synchronized with the absolute time information acquired from the external source is generated. In this case, in the time information generating unit time information is generated by shifting, to the shifted time, occurrence time of the leap second that can be represented by the absolute time information acquired from the external source.

The transmission unit transmits the signal including the transmission media and the absolute time information generated by the time information generating unit. This signal includes a broadcasting signal from a broadcasting station or a distribution signal from a distribution server. Moreover, the absolute time information is included in an NTP format, for example.

In this manner, in the absolute time information transmitted with transmission media in the present technology, occurrence time of a leap second is shifted to shifted time. Therefore, arranging the shifted time at time when influence on viewing is small can suppress influence on a reception side by occurrence of a leap second.

Note that in the present technology for example when occurrence time of a leap second is in a shifted state, absolute time information generated by the time information generating unit may be added with mode information representing as being in this state. This mode information allows the reception side to easily recognize that the occurrence time of a leap second is in the shifted state.

In this case, the mode information may be modified to represent as being in a normal state a certain period of time prior to the shifted time. This allows the reception side to recognize the shifted time in advance and to promptly prepare for occurrence of a leap second.

Moreover, another concept of the present technology resides in a reception apparatus, including: a reception unit which receives a signal including transmission media and absolute time information; a time information generating unit which generates absolute time information synchronized with the absolute time information included in the signal received by the reception unit; and a processing unit which processes the transmission media on the basis of the absolute time information generated by the time information generating unit. When occurrence time of the leap second is in a shifted state, the absolute time information included in the signal received by the reception unit is added with mode information representing as being in this state, the mode information is modified to represent as being in a normal state a certain period of time prior to the shifted time, and the time information generating unit generates a leap second at the shifted time on the basis of the mode information.

In the present technology, the reception unit receives a signal including transmission media and the absolute time information. The time information generating unit generates absolute time information synchronized with the absolute time information included in the signal received by the reception unit. The processing unit further processes the transmission media on the basis of the absolute time information generated by the time information generating unit.

When absolute time information included in the signal received by the reception unit is in a shifted state of occurrence time of a leap second, the absolute time information is added with mode information representing as being in this state and the mode information is modified to represent as being in a normal state a certain period of time prior to the shifted time. In the time information generating unit, a leap second is generated at the shifted time on the basis of the mode information.

In this manner, in the present technology a leap second is generated at the shifted time on the basis of the mode information transmitted while added to the absolute time information. The mode information is modified to represent as being in a normal state a certain period of time prior to the shifted time, thereby allowing the shifted time to be recognized in advance. Thus, a leap second can be surely generated at the shifted time.

Moreover, another concept of the present technology resides in a transmission apparatus including: a time information generating unit which generates absolute time information synchronized with absolute time information acquired from an external source; a presentation time generating unit which generates presentation time of each presentation unit group formed by a predetermined number of presentation units of transmission media on the basis of the absolute time information generated by the time information generating unit; an identification information generating unit which generates identification information identifying the first presentation unit group referring to absolute time information after occurrence of a leap second when the leap second occurs in the absolute time information generated by the time information generating unit; and a transmission unit which transmits a signal including the transmission media, the absolute time information generated by the time information generating unit, presentation time of each presentation unit group generated by the presentation time generating unit, and the identification information generated by the identification information generating unit.

In the present technology, absolute time information acquired from an external source is referred to in the time information generating unit For example, absolute time information is acquired in a Network Time Protocol (NTP) long format from an NTP server by the NTP or from another device by the IEEE1588PTP.

In the time information generating unit, absolute time information synchronized with the absolute time information acquired from the external source is generated. The presentation time generating unit generates presentation time of each presentation unit group formed by a predetermined number of presentation units of transmission media on the basis of the absolute time information generated by the time information generating unit. When a leap second occurs in the absolute time information generated by the time information generating unit, the identification information generating unit generates identification information identifying the first presentation unit group referring to absolute time information after occurrence of the leap second.

The transmission unit transmits a signal including the transmission media, the absolute time information generated by the time information generating unit, presentation time of each presentation unit group generated by the presentation time generating unit, and the identification information generated by the identification information generating unit. This signal includes a broadcasting signal from a broadcasting station or a distribution signal from a distribution server. Moreover, the absolute time information is included in an NTP format, for example.

For example, the signal may include a first packet including the transmission media, a second packet including information related to the transmission media, and a third packet including the absolute time information. The presentation time and the identification information of each presentation unit group may be inserted in the second packet.

In this manner, in the present technology identification information that identifies the first presentation unit group referring to absolute time information after occurrence of a leap second is transmitted together with transmission media and other data. This allows the reception side to adjust presentation time of each presentation unit group of the transmission media on the basis of the identification information. This can suppress influence by occurrence of a leap second.

Moreover, another concept of the present technology resides in a reception apparatus including: a reception unit which receives a signal including transmission media, absolute time information, presentation time of each presentation unit group formed by a predetermined number of presentation units of the transmission media, and identification information identifying the first presentation unit group referring to absolute time information after occurrence of a leap second when the leap second occurs in the absolute time information; and a time information generating unit which generates absolute time information synchronized with the absolute time information included in the signal received by the reception unit. The time information generating unit generates the absolute time information on a continuous time axis even at the occurrence time of the leap second in the absolute time information. The reception apparatus further includes: a presentation time adjusting unit which, out of presentation time of each presentation unit group included in the signal received by the reception unit, adjusts presentation time of each presentation unit group from and after a presentation unit group specified by the identification information included in the signal received by the reception unit; and a processing unit which performs presentation processing on the transmission media on the basis of the absolute time information generated by the time information generating unit and presentation time of each presentation unit group adjusted by the presentation time adjusting unit.

In the present technology, the reception unit receives a signal including the transmission media, the absolute time information, presentation time of each presentation unit group formed by a predetermined number of presentation units of the transmission media, and, when a leap second occurs in the absolute time information, the identification information identifying the first presentation unit group referring to absolute time information after occurrence of the leap second.

The time information generating unit generates absolute time information synchronized with the absolute time information included in the signal received by the reception unit. In the time information generating unit, absolute time information is generated on a continuous time axis even at the occurrence time of the leap second.

Out of presentation time of each presentation unit group included in the signal received by the reception unit, the presentation time adjusting unit adjusts presentation time of each presentation unit group from and after a presentation unit group specified by the identification information included in the signal received by the reception unit. For example, in the presentation time adjusting unit, one second is added to each presentation time when occurrence of a leap second is insertion of the leap second and one second is subtracted from each presentation time when occurrence of a leap second is deletion of the leap second.

The processing unit processes the transmission media on the basis of the absolute time information generated by the time information generating unit and presentation time of each presentation unit group adjusted by the presentation time adjusting unit.

In this manner, in the present technology absolute time information is generated on a continuous time axis even at the occurrence time of the leap second in the time information generating unit. Also, presentation time of each presentation unit group of the transmission media is adjusted on the basis of the identification information identifying the first presentation unit group referring to absolute time information after occurrence of the leap second. Therefore, influence by occurrence of a leap second can be suppressed.

Moreover, another concept of the present technology resides in a transmission apparatus, including: a time information generating unit which generates absolute time information synchronized with absolute time information acquired from an external source; a presentation time generating unit which generates presentation time of each presentation unit group formed by a predetermined number of presentation units of transmission media on the basis of the absolute time information generated by the time information generating unit; a time difference information generating unit which generates time difference information representing time difference, of the absolute time information generated by the time information generating unit referred to when presentation time of each presentation unit group is generated by the presentation time generating unit, from absolute time information in another transmission device; and a transmission unit which transmits a signal including the transmission media, presentation time of each presentation unit group generated by the presentation time generating unit, and the time difference information of each presentation unit group generated by the time difference information generating unit.

In the present technology, absolute time information acquired from an external source is referred to in the time information generating unit For example, absolute time information is acquired in a Network Time Protocol (NTP) long format from an NTP server by the NTP or from another device by the IEEE1588PTP.

In the time information generating unit, absolute time information synchronized with the absolute time information acquired from the external source is generated. The presentation time generating unit generates presentation time of each presentation unit group formed by a predetermined number of presentation units of transmission media on the basis of the absolute time information generated by the time information generating unit.

The time difference information generating unit generates time difference information representing time difference, of the absolute time information generated by the time information generating unit referred to when presentation time of each presentation unit group is generated by the presentation time generating unit, from absolute time information in another transmission device.

The transmission unit transmits a signal including the transmission media, the presentation time of each presentation unit group generated by the presentation time generating unit, and the time difference information of each presentation unit group generated by the time difference information generating unit. This signal includes a broadcasting signal from a broadcasting station or a distribution signal from a distribution server.

For example, the signal may include a first packet including the transmission media and a second packet including information related to the transmission media while the presentation time of each presentation unit group and the time difference information of each presentation unit group may be inserted in the second packet.

In this manner, in the present technology time difference information representing time difference, of the absolute time information referred to when presentation time of each presentation unit group is generated, from absolute time information in another transmission device, is transmitted together with the transmission media. This allows the reception side to adjust the presentation time of each presentation unit group of the transmission media on the basis of the time difference information and to process the transmission media on the basis of the absolute time information synchronized with the absolute time information from the other transmission device in a preferable manner.

Moreover, another concept of the present technology resides in a reception apparatus, including: a reception unit which receives a first signal from a first transmission device and a second signal from a second transmission device. The first signal includes first transmission media, absolute time information, and first presentation time of each presentation unit group formed by a predetermined number of presentation units of the first transmission media and the second signal includes second transmission media and second presentation time and time difference information for each presentation unit group formed by a predetermined number of presentation units of the second transmission media. The reception apparatus, further including: a time information generating unit which generates absolute time information synchronized with the absolute time information included in the first signal; and a processing unit which processes the first transmission media on the basis of the absolute time information generated by the time information generating unit and the first presentation time of each presentation unit group of the first transmission media included in the first signal and processes the second transmission media on the basis of the absolute time information generated by the time information generating unit and the second presentation time of each presentation unit group of the second transmission media adjusted by the time information adjusting unit.

In the present technology, the reception unit receives the first signal from the first transmission device and the second signal from the second transmission device. The first signal includes the first transmission media, the absolute time information, and the first presentation time of each presentation unit group formed by a predetermined number of presentation units of the first transmission media. Moreover, the second signal includes the second transmission media and the second presentation time and the time difference information of each presentation unit group formed by a predetermined number of presentation units of the second transmission media.

The time information generating unit generates absolute time information synchronized with the absolute time information included in the first signal. The presentation time adjusting unit adjusts the second presentation time of each presentation unit group of the second transmission media included in the second signal on the basis of the time difference information included in the second signal.

The processing unit processes the first transmission media on the basis of the absolute time information generated by the time information generating unit and the first presentation time of each presentation unit group of the first transmission media included in the first signal. Moreover, the processing unit processes the second transmission media on the basis of the absolute time information generated by the time information generating unit and the second presentation time of each presentation unit group of the second transmission media adjusted by the time information adjusting unit.

In this manner, in the present technology the second presentation time of each presentation unit group of the second transmission media is adjusted on the basis of the time difference information. Therefore, it is made possible to process the second transmission media on the basis of the absolute time information synchronized with the absolute time information from the other transmission device in a preferable manner, thereby enabling presentation synchronization of the first transmission media and the second transmission media.

Effects of the Invention

According to the present technology, influence on a reception side by occurrence of a leap second can be suppressed. Note that effects described herein are merely examples and thus are not limited thereto. Additional effects may also be included.

BRIEF DESCRIPTION OF DRAWINGS

FIGS. 6(a) and 6(b) are diagrams illustrating an exemplary configuration of an MMTP payload and a DU_header, respectively.

FIG. 9 is a diagram illustrating descriptions of major parameters in a PA message.

FIG. 10 is a diagram illustrating descriptions of major parameters in an MP table.

FIG. 11 is a diagram illustrating an exemplary structure of an MPU timestamp descriptor.

FIG. 13 is a diagram illustrating an exemplary structure of an MPU extended timestamp descriptor.

FIG. 17 is a diagram illustrating an exemplary structure of NTP data.

FIGS. 18(a) and 18(b) are diagrams for explaining a leap second indicator and an NTP operation mode in the exemplary structure of NTP data.

FIGS. 19(a) to 19(c) are diagrams for explaining influence on operation of MMTP packets by insertion of a leap second.

FIGS. 20(a) to 20(c) are diagrams for explaining influence on operation of MMTP packets by deletion of a leap second.

FIGS. 21(a) to 21(e) are diagrams for explaining influence on operation of a video MPU by insertion of a leap second.

FIGS. 22(a) to 22(e) are diagrams for explaining influence on operation of a video MPU by deletion of a leap second.

FIGS. 23(a) to 23(d) are diagrams for explaining an exemplary method of a broadcasting sending system regarding insertion of a leap second.

FIGS. 24(a) to 24(d) are diagrams for explaining an exemplary method of a broadcasting sending system regarding deletion of a leap second.

FIG. 25 is a diagram illustrating an exemplary structure of an MPU extended timestamp descriptor newly defined with a leap second control signal.

FIG. 26 is a diagram for explaining leap second control signals forming identification information.

FIG. 31 is a block diagram illustrating an exemplary configuration of a transmission/reception system as a second embodiment.

FIGS. 32(a) to 32(h) are diagrams illustrating exemplary presentation synchronization processing in multistream service 1 in a case where a leap second is inserted.

FIGS. 33(a) to 33(h) are diagrams illustrating exemplary presentation synchronization processing in multistream service 2 in a case where a leap second is inserted.

FIGS. 34(a) to 34(h) are diagrams illustrating exemplary presentation synchronization processing in multistream service 1 in a case where a leap second is deleted.

FIGS. 35(a) to 35(h) are diagrams illustrating exemplary presentation synchronization processing in multistream service 2 in a case where a leap second is deleted.

MODE FOR CARRYING OUT THE INVENTION

Embodiments for carrying out the invention (hereinafter referred to as "embodiments") will be described below. Note that explanation will be given in the order below.

1. First Embodiment
2. Second Embodiment
3. Variation

<1. First Embodiment>

[Exemplary Configuration of Transmission/Reception System]

Figure 1:
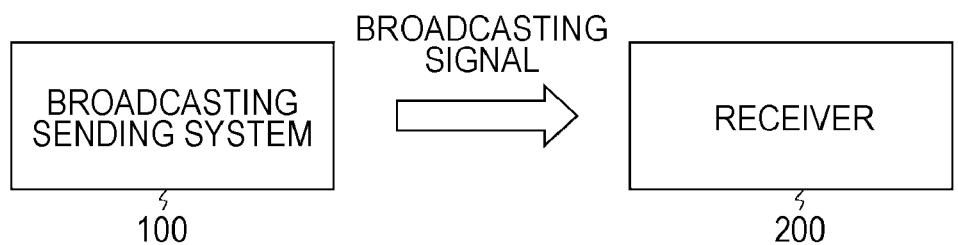
FIG. 1 is a block diagram illustrating an exemplary configuration of a transmission/reception system as a first embodiment.

FIG. 1 illustrates an exemplary configuration of a transmission/reception system 10 as a first embodiment. The transmission/reception system 10 includes a broadcasting sending system 100 and a receiver 200.

The broadcasting sending system 100 transmits a broadcasting signal of the Internet Protocol (IP) system including transmission media such as video and audio. The broadcasting sending system 100 acquires absolute time information from an external source. For example, it is acquired in a Network Time Protocol (NTP) long format from an NTP server by the NTP or from another device by the IEEE1588PTP.

The broadcasting sending system 100 generates absolute time information synchronized with the absolute time information acquired from the external source. A broadcasting signal includes transmission media as well as the generated absolute time information and presentation time of each presentation unit group formed by a predetermined number of presentation units of transmission media. This presentation time is generated on the basis of the generated absolute time information.

The broadcasting sending system 100 performs a method for suppressing influence on a reception side by occurrence of a leap second. In this embodiment, a first method or a second method is performed. In the first method, upon generating absolute time information synchronized with absolute time information acquired from an external source, occurrence time of a leap second is shifted to shifted time, for example to time when influence on viewing is small. Then, in a shifted state of occurrence time of a leap second, the absolute time information is transmitted while added with mode information representing as being in this state. This mode information is modified to represent as being in a normal state a certain period of time prior to the shifted time. In the second method, identification information that identifies the first presentation unit group referring to absolute time information after occurrence of a leap second is transmitted together with transmission media and other data.

The receiver 200 receives the broadcasting signal of the IP system described above which is transmitted from the broadcasting sending system 100. The receiver 200 generates absolute time information synchronized with the absolute time information included in the broadcasting signal. The receiver 200 processes the transmission media included in the broadcasting signal on the basis of the generated absolute time information and presentation time of each presentation unit group included in the broadcasting signal.

The receiver 200 performs a method corresponding to the method in the broadcasting sending system 100 described above. In the first method, a leap second is generated in the generated absolute time information on the basis of the mode information added to the absolute time information included in the broadcasting signal. In the second method, upon generating absolute time information synchronized with the absolute time information included in the broadcasting signal, the absolute time information is generated on a continuous time axis even at the occurrence time of the leap second. Furthermore, presentation time of each presentation unit group from and after a presentation unit specified by the identification information identifying the first presentation unit group referring to the absolute time information after occurrence of the leap second included in the broadcasting signal is adjusted.

Figure 2:
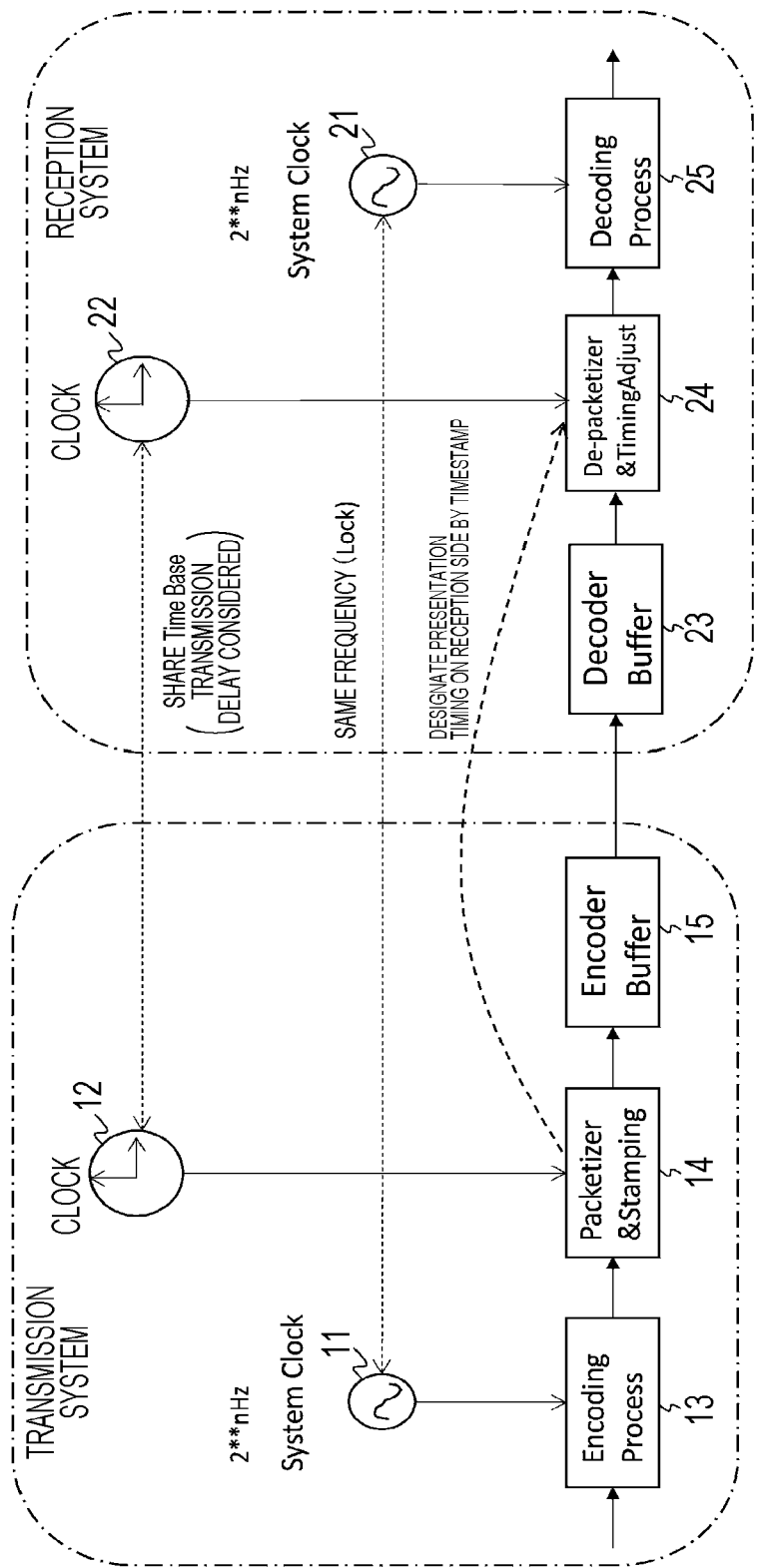
FIG. 2 is a diagram for explaining clock synchronization and presentation synchronization in the transmission/reception system.

In the transmission/reception system 10 illustrated in FIG. 1, clock synchronization and presentation synchronization are implemented. Clock synchronization and presentation synchronization in the transmission/reception system will be described with FIG. 2. A transmission system and a reception system correspond to, for example, the broadcasting sending system 100 and the receiver 200, respectively, described above. The transmission system includes a clock generating unit 11 that generates a system clock of 2n Hz and a clock unit (time information generating unit) 12 that generates time information. The transmission system further includes an encoding processing unit 13, a packetizer/timestamp adder 14, and an encode buffer 15**.

In the encoding processing unit 13, transmission media such as video and audio are encoded. In the packetizer/timestamp adder 14, the encoded transmission media are packetized and presentation time information is added to each presentation unit group of a predetermined number of presentation units of the transmission media on the basis of the time information generated by the clock unit 12. The packets of the transmission media are then temporarily accumulated in the encode buffer 15 and transmitted at an appropriate timing.

The reception system includes a clock generating unit 21 that generates a system clock of 2n Hz and a clock unit (time information generating unit) 22 that generates time information. The reception system further includes a decode buffer 23, a de-packetizer/timestamp adjusting unit 24, and a decoding processing unit 25**.

In the decode buffer 23, the received packets of the transmission media are temporarily accumulated. In the de-packetizer/timestamp adjusting unit 24, the time information generated by the clock unit 22 is referred to and the packets of the transmission media accumulated in the decode buffer 23 are extracted and de-packetized at a timing based on presentation time added thereto. In the decoding processing unit 25, the transmission media obtained by de-packetizing are decoded and transmission media in a baseband are thereby obtained.

Clock synchronization means that, basically, a frequency of a system clock generated by the clock generating unit 11 in the transmission system and a frequency of a system clock generated by the clock generating unit 21 in the reception system are the same frequency. Note that the same frequency is not necessarily required but it is only required that relation such as that a frequency is an integral multiple is retained. In a case where clock synchronization is not implemented, a failure occurs such as generation of a skipped frame while reception is continued on the reception side.

Furthermore, presentation synchronization means to match time information of the clock unit 12 of the transmission system with time information of the clock unit 22 of the reception system and to add presentation time information of each presentation unit of transmission media to a packet of the transmission media. Note that in a case where time information of the clock unit 22 of the reception system is matched here with time information of the clock unit 12 of the transmission system, transmission delay from the transmission system to the reception system is considered. In a case where presentation synchronization is not implemented, appropriate presentation without a failure of a buffer through synchronization of video and audio on the reception side cannot be implemented.

Referring back to FIG. 1, as described above, a broadcasting signal of the IP system is transmitted from the broadcasting sending system 100 to the receiver 200. In this embodiment, a broadcasting signal of the IP system is in the MPEG Media Transport (MMT) system.

Figure 3:
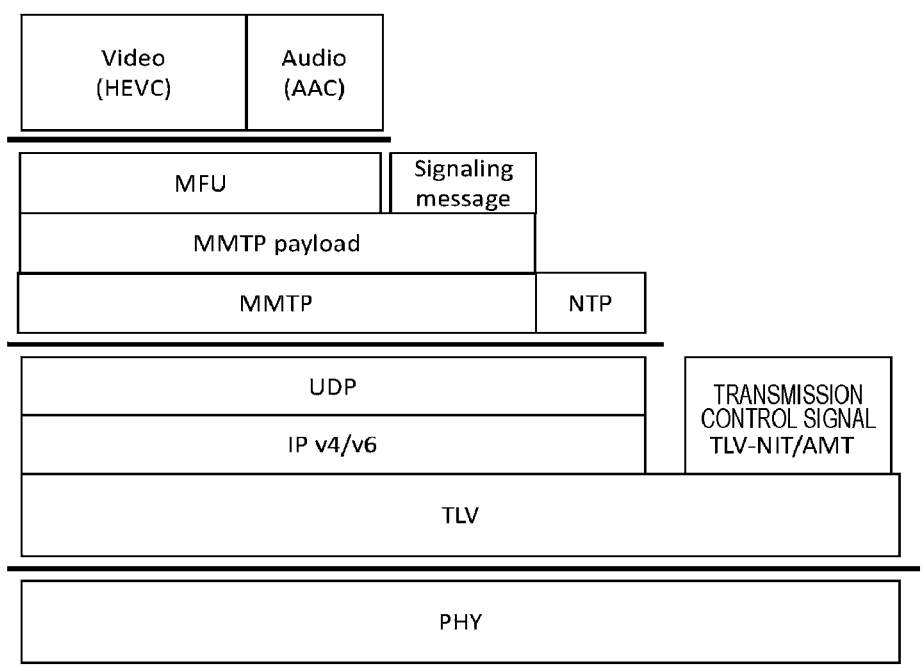
FIG. 3 is a diagram illustrating a protocol stack of the MMT system.

FIG. 3 illustrates a protocol stack of the MMT system. There is a physical layer (PHY) in a subordinate layer. The physical layer includes a modulation system, an error correction system, and other systems. Over this physical layer, there is a layer of transmission packets of Type Length Value (TLV). IP packets are placed over the transmission packets of TLV.

Furthermore, the User Datagram Protocol (UDP) is placed over the IP packets. Meanwhile, transmission control signals as signaling information are also placed over the transmission packets of TLV. Moreover, MMTP packets are placed over the UDP. A payload part of the MMTP packet includes an MMT fragment unit (MFU) including encoded data of transmission media such as video and audio or a signaling message including information related to the transmission media. Note that, as illustrated, there are also Network Time Protocol (NTP) packets including time information over the UDP.

FIGS. 4(a) to 4(e) illustrate an exemplary configuration of an MMT system broadcasting stream (broadcasting signal). FIG. 4(a) is illustrates an elementary stream of video (Video ES). The elementary stream of the video is divided into groups of a predetermined size and then arranged in a payload part of an MFU as illustrated in FIG. 4(b).

As illustrated in FIG. 4(c), an MMTP payload header is added to an MFU and an MMTP payload is thereby formed. Moreover, as illustrated in FIG. 4(d), an MMT header is further added to this MMTP payload and an MMTP packet is thereby formed. Note that some MMTP packets include a signaling message in a payload part thereof. As illustrated in FIG. 4(e), the MMTP packet is added with an UDP header, an IP header, and a TLV header. A TLV packet that forms an MMT system broadcasting stream is thus generated.

Note that TLV packets include an NTP packet including time information of NIP. Moreover, although illustration is omitted, TLV packets include those including an MMTP packet of other transmission media such as audio or subtitles. This MMT system broadcasting stream includes a first packet including transmission media (MMTP packet), a second packet including signaling information (MMTP packet), and a third packet including time information (NTP packet).

Figure 5:
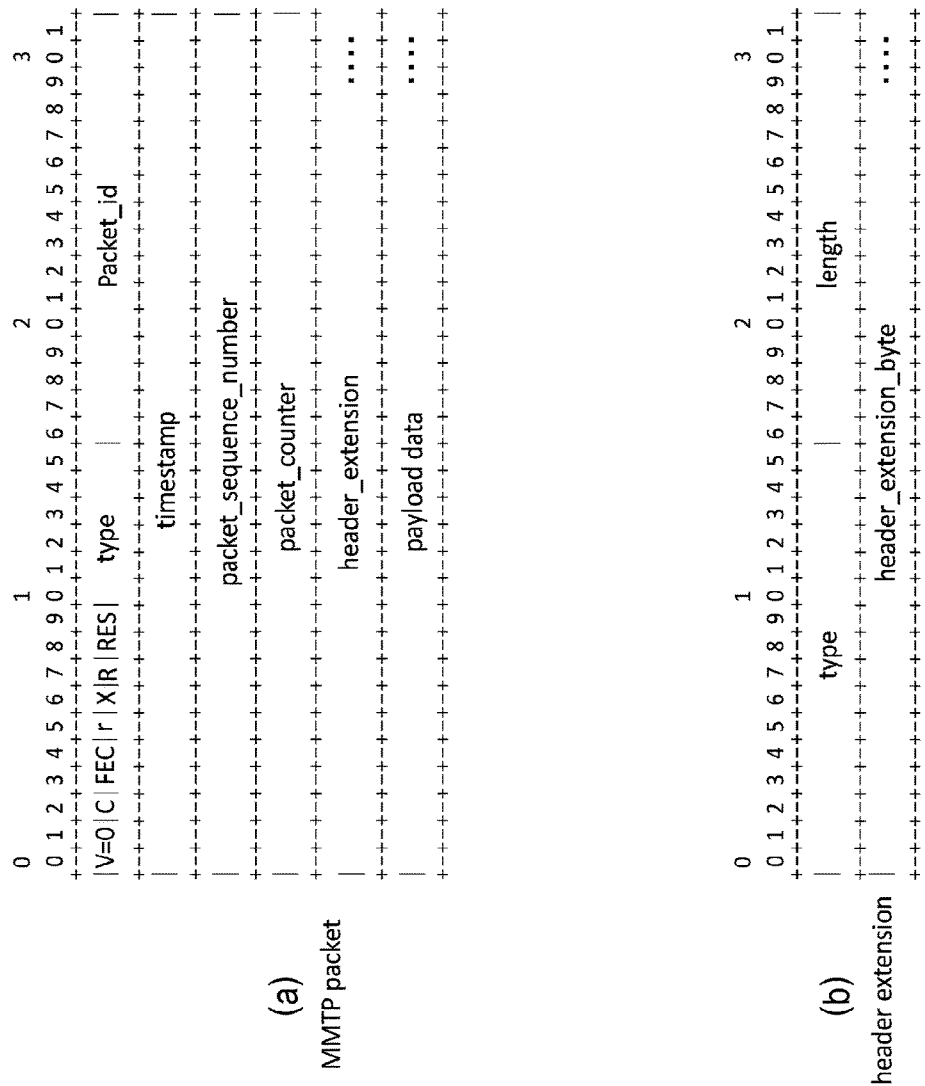
FIGS. 5(a) and 5(b) are diagrams illustrating an exemplary configuration of an MMTP packet and an MMT header extension, respectively.

FIG. 5(a) illustrates an exemplary configuration (syntax) of an MMTP packet. The MMTP packet includes an MMT header and an MMTP payload. A one-bit flag information of "C" represents whether afield of "packet_counter" is included. The example illustrated illustrates that "packet_counter" is included. A two-bit field of "FEC" represents a format of forward error correction (FEC).

A one-bit flag information of "X" represents whether an MMT header extension, that is, a field of "header_extension" is included. The example illustrated illustrates that "header_extension" is included. A one-bit flag information of "R" represents whether a random access point, or an I picture, is included.

A six-bit field of "type" represents a type of MMTP packet. For example, "0 x 00 " represents that the MMTP packet includes a Media Processing Unit (MPU) as a payload and "0 x 02 " represents that the MMTP packet includes a signaling message as a payload.

A 16-bit field of "packet_id" is an identifier for identifying an asset such as video and audio. A 32-bit field of "timestamp" represents a timestamp for transmission, that is, time when the MMTP packet leaves a transmission side. This time is represented by an NTP short format. A field of "packet_sequence_number" represents a sequence number of an MMTP packet having the same "packet_id". A 32-bit field of "packet_counter" represents a sequence number of all MMTP packets regardless of "packet_id".

When the one-bit flag information of "X" described above is "1", a field of "header_extension" that is an MMT header extension is arranged after the 32-bit field of "packet_counter". Subsequently, a field of "payload data" that forms the MMTP payload is included.

FIG. 5(b) illustrates an exemplary configuration (syntax) of an MMT header extension. A 16-bit field of "type" represents a type of header extension. A 16-bit field of "length" represents a byte size of a subsequent header extension. A byte size of the header extension is different depending on a type of the header extension. A main body of the header extension is inserted in a field of "header_extension_value".

FIG. 6(a) illustrates an exemplary configuration (syntax) of an MMTP payload arranged at a field of "payload data" of the MMTP packet described above. Note that this example represents a case of an MPU mode in which "type" in the MMT header is "0x00". First included is header information. A 16-bit field of "length" represents a byte size of the entire MMTP payload. A four-bit field of "FT" represents a field type. A value "0" represents that "MPU metadata" is included, "1" represents that "Movie Fragment metadata" is included, and "2" represents an "MFU" is included.

Here, an MMT fragment unit (MFU) is a fragmented MPU. For example in the case of video, an MFU can be set to correspond to one NAL unit. Furthermore, in the case of transmitting by a communication network transmission path, an MFU can have one or more MTU sizes.

Moreover, an MPU starts from a random access pint (RAP) and includes one or more access units (AUs). Specifically, for example one picture of one group of pictures (GOP) may form one MPU. Such anMPU is defined for each asset. Therefore, an MPU of video including only video data is generated from an asset of video and an MPU of audio including only audio data is generated from an asset of audio.

A one-bit flag information of "T" represents whether timed media are transmitted or non-timed media are transmitted. A value "1" represents timed media and "0" represents non-timed media. In this embodiment, transmission of timed media is assumed.

A two-bit field of "f_i" represents that a field of "DU payload" includes an integral number of data unit (DUs) or one of the first, an intermediate, and the last fragments obtained by fragmentation of a data unit. A value of "0" represents that an integral number of data units are included and "1" represents that the first fragment is included. A value of "2" represents that an intermediate fragment is included and "3" represents that the last fragment is included.

A one-bit flag information of "A" represents whether the field of "DU payload" includes a plurality of data units. A value "1" represents inclusion and "0" represents non-inclusion. An eight-bit field of "frag_counter" represents an order of the fragment when "f_i" is one of 1 to 3.

A 32-bit field of "MPU_sequence_number" is a number representing an order of the MPU and is information identifying the MPU. For example in a case where one GOP forms one MPU, when "MPU_sequence_number" of a GOP is "i", an "MPU_sequence_number" of a subsequent GOP equals "i+1".

After the field of "MPU_sequence_number", fields of "DU_length", "DU_header", and "DU payload" are arranged. A 16-bit field of "DU_length" is not included in a case where "A=0" holds as described above, that is, in a case where a plurality of data units are not included in the field of "DU payload". Moreover, afield of "DU_header" is not included in a case where "FT=0/1" holds, that is, in a case where "MPU metadata" or "Movie Fragment metadata" is included.

FIG. 6(b) illustrates an exemplary configuration (syntax) of "DU_header". Note that this example represents a case of "T=1", that is, transmitting timed media. A 32-bit field of "movie_fragment_sesquence_number" represents a sequence number in MFU units. For example when an I picture is divided, each piece forms an MFU. A 32-bit field of "sample_number" represents a number of a picture unit for example in the case of video. A 32-bit field of "offset" represents an offset value (byte value) from the head of a picture for example in the case of video.

Figure 7:
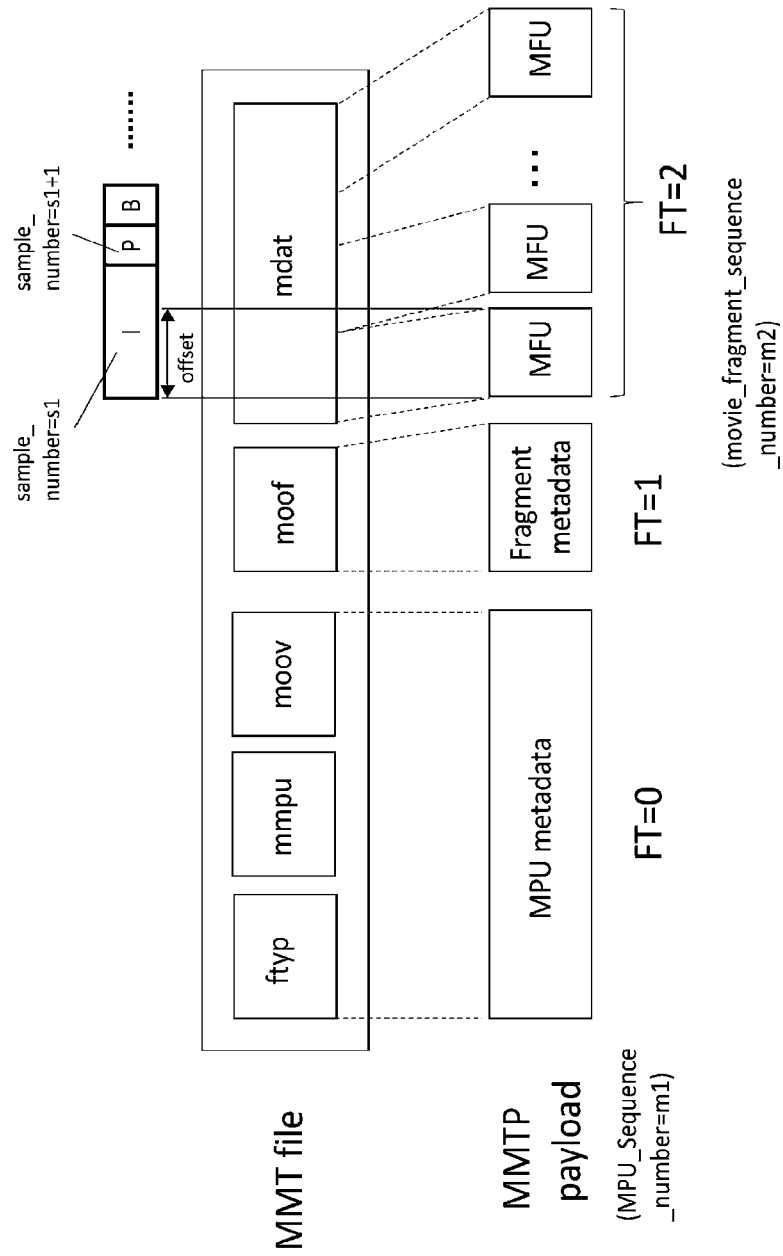
FIG. 7 is a diagram illustrating exemplary correspondence between an MMT file and an MMTP payload.

In the MMT system, transmission media such as video is transmitted by a content format based on fragmented ISO base media file format (ISOBMFF). FIG. 7 illustrates exemplary correspondence between an MMT file and an MMTP payload when video data of one GOP is transmitted.

A configuration of an MMT file is, basically, substantially equivalent to a file configuration of the MP4. A box of "styp" is included in the head. Subsequently, a box of "sidx" as segment information is included. Then, a box of "mmpu" unique to the MMT is included. A box of "moov" as metadata of the entire file is then included.

Subsequently, a movie fragment is included. A movie fragment is formed by a "moof" box where control information is contained and an "mdat" box where encoded data of video is contained. Here, it is assumed that one GOP forms one MPU and thus only one pair of movie fragments is included.

Metadata of the boxes "styp", "mmpu", and "moon" is transmitted by one MMTP packet as "MPU metadata". In this case, "FT=0" holds. Metadata of the box "moof" is transmitted by one MMTP packet as "Movie Fragment metadata". In this case, "FT=1" holds. Encoded data of video included in the "mdat" box is fragmented into "MFUs", each of which is transmitted by one MMTP packet. In this case, "FT=2" holds.

Next, an MMT package table (MPT) will be described. Note that some MMTP packets include a signaling message as a payload thereof as described above. As such a signaling message, there is a package access message (PA message) including an MPT. An MPT represents by what components (assets) a broadcasting service is formed.

Figure 8:
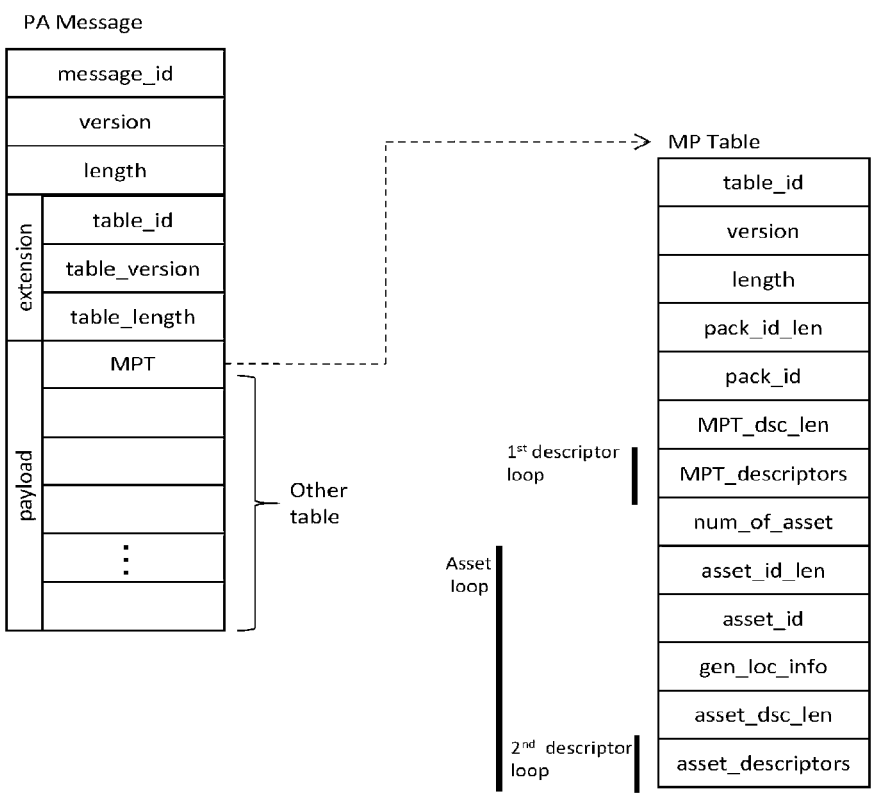
FIG. 8 is a diagram illustrating exemplary configuration of a PA message and an MP table.

FIG. 8 illustrates an exemplary configuration of a package access message (PA message) and an MMT package table (MP table (MPT)). Furthermore, FIG. 9 illustrates descriptions of major parameters of a PA message. FIG. 10 illustrates descriptions of major parameters of an MP table.

A parameter of "message_id" is a fixed value for identifying a PA message in various signaling information. A parameter of "version" is an integer value of eight bits representing a version of a PA message. For example, increment is performed by one in a case where a part of parameters forming an MP table is updated. A parameter of "length" is the number of bytes representing the size of a PA message counted immediately after this field.

In a field of "extension", index information of a table arranged in a field of a payload is arranged. In this field, fields of "table_id", "table_version", and "table_length" of the same number as the number of tables are arranged. A parameter of "table_id" is a fixed value for identifying a table. A parameter of "table_version" represents a version of the table. A parameter of "table_length" is the number of bytes representing the size of the table.

In the field of a payload of a PA message, an MP table and other tables of a predetermined number are arranged. A configuration of an MPT will be described below.

A parameter of "table_id" is a fixed value for identifying an MP table in various signaling information. A parameter of "version" is an integer value of eight bits representing a version of an MP table. For example, increment is performed by one in a case where a part of parameters forming an MP table is updated. A parameter of "length" is the number of bytes representing the size of the MP table counted immediately after this field.

A parameter of "pack_id" is identification information as the entire package having all signals or files transmitted by broadcasting signals as components. This identification information is text information. A parameter of "pack_id_len" represents the size (the number of bytes) of the text information. A field of "MPT_descriptors" is a storage area for descriptors related to the entire package. A parameter of "MPT_dsc_len" represents the size (the number of bytes) of the field.

A parameter of "num_of_asset" represents the number of assets (signals, files or the like) as elements forming the package. The same number of the following asset loops as the above number are arranged. A parameter of "asset_id" is information (asset ID) uniquely identifying an asset. This identification information is text information. A parameter of "asset_id_len" represents that the size (the number of bytes) of the text information. A parameter of "gen_loc_info" is information representing a location of a destination of the asset.

A field of "asset_descriptors" is a storage area for descriptors related to the asset. A parameter of "asset_dsc_len" represents the size (the number of bytes) of the field. As a descriptor stored in the field of "asset_descriptors", there is an MPU timestamp descriptor (MPU_Timestamp_Descriptor). In this descriptor, presentation time of a presentation unit in the head of an MPU is described.

FIG. 11 illustrates an exemplary structure (syntax) of an MPU timestamp descriptor. A 16-bit field of "descriptor_tag" represents a descriptor type. Here, an MPU timestamp descriptor is represented. An eight-bit field of "descriptor_length" represents the length (size) of a descriptor and represents the number of subsequent bytes as the length of the descriptor.

Also, the same number of pairs of "mpu_sequence_number" and "mpu_presentation_time" as the number of MPUs are included. A 32-bit field of "mpu_sequence_number" is a number representing an order of an MPU as described above and is information identifying the MPU. The 64-bit field of "mpu_presentation_time" represents presentation time of a presentation unit in the head of an MPU. For example, where MPU=GOP, this presentation time represents presentation time of a picture in the head of the GOP. This time is represented by an NTP long format.

Figure 12:
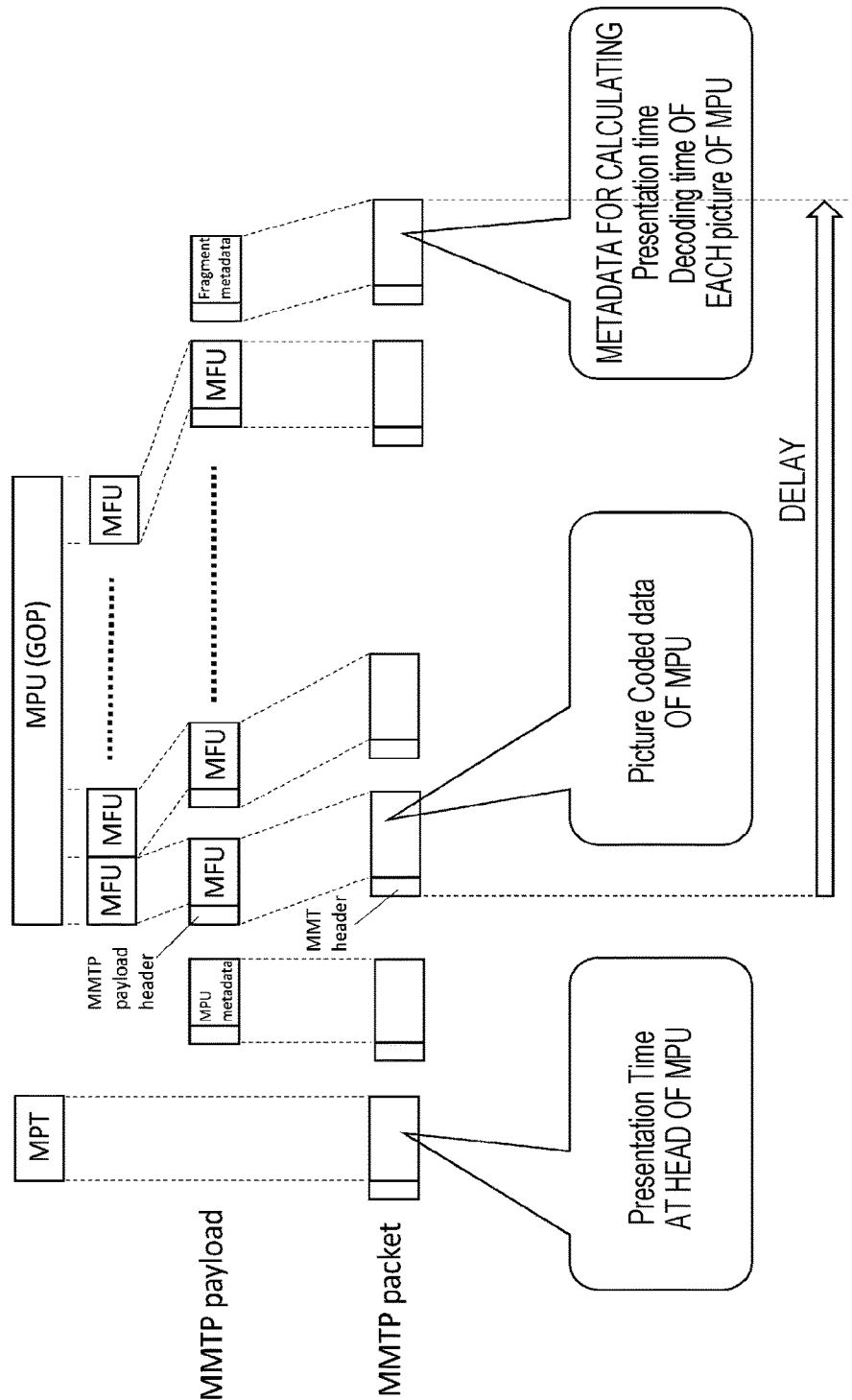
FIG. 12 is a diagram for explaining an order of transmission in a broadcasting stream of the MMT system.

FIG. 12 illustrates an exemplary order of transmission of the MMT system. In the diagram illustrated, an example of transmitting an MPU formed by video data of one GOP is illustrated. At first, an MMTP packet having a signaling message including an MP table as a payload is transmitted. In this MP table, the MPU timestamp descriptor described above is inserted. Upon encoding by an encoder, presentation time of a picture in the head of the GOP is detected and the presentation time is described in the MPU timestamp descriptor.

After the MMTP packet having the signaling message including the MP table as a payload is transmitted, an MMTP packet having the GOP as a payload is transmitted. In this case, the GOP is fragmented and transmitted in units of MFUs. An MMTP payload header is added before an MFU and an MMTP payload is thereby formed. Furthermore, the entire MMTP payload forms payload data of an MMTP packet.

Here, "MPU metadata" is transmitted before the GOP data; however, "Movie fragment metadata" is transmitted after the GOP data. In this "Movie fragment metadata", metadata for calculating decoding time (DT) and presentation time (PT) of each picture of the GOP is included. Basically, information for calculating DT and PT of each picture of GOP cannot be obtained before encoding GOP data. Therefore, "Movie fragment metadata" is transmitted after the GOP data.

In a case where DT and PT of each picture of the GOP is calculated using "Movie fragment metadata", it is required to delay the GOP data until "Movie fragment metadata" is received. Therefore, even without delaying the GOP data on a transmission side, a reception side delays the GOP data.

[Transmission of time acquisition information for obtaining decoding time DT and presentation time PT]

In this embodiment, time acquisition information (DT/PT information) for obtaining decoding time DT and presentation time PT for each presentation unit (sample) of transmission media is transmitted while inserted in an MMTP packet including a signaling message in a payload. This allows a reception side to suppress delay for performing processing by decoding time and presentation time.

As described above, in an MPU timestamp descriptor (MPU_Timestamp_Descriptor), presentation time of a presentation unit in the head of an MPU is arranged. Furthermore, time length information for calculating decoding time and presentation time of each presentation unit of an MPU by referring to presentation time of a presentation unit in the head of the MPU is arranged in an MPU extended timestamp descriptor (MPU_Extended_Timestamp_Descriptor). The MPU extended timestamp descriptor is stored in the field of "asset_descriptors" in an MP table (see FIG. 8).

The time length information arranged in the MPU extended timestamp descriptor is formed by decoding time information of a presentation unit, transmitted first, represented by an offset time length from the presentation time of the first presentation unit, information representing time length for each presentation unit, and presentation time information represented by an offset time length from decoding time for each presentation unit.

FIG. 13 illustrates an exemplary structure (syntax) of an MPU extended timestamp descriptor. A 16-bit field of "descriptor_tag" represents a descriptor type. Here, an MPU extended timestamp descriptor is represented. An eight-bit field of "descriptor_length" represents the length (size) of a descriptor and represents the number of subsequent bytes as the length of the descriptor.

A two-bit field of "pts_offset_type" represents a difference in presentation time between an immediately preceding presentation unit (access unit) and the current presentation unit in a presenting order in the same MPU. A value "0" represents a fixed value specified in advance. A value "1" represents designation as a default value by the descriptor. A value "2" represents designation for each presentation unit by the descriptor.

A one-bit field of "timescale_flag" represents whether a subsequent timescale field is included. A value "1" represents that a timescale field is included and "0" represents that no timescale field is included. When "timescale_flag" is "1", a 32-bit field of "timescale" is included. This field represents a unit of time in the descriptor. A value obtained by dividing one second by a timescale is the unit of time.

When "pts_offset_type" is "1", a 16-bit field of "default_pts_offset" is included. This field represents, in time units represented by a timescale, a default value as a difference in presentation time between an immediately preceding presentation unit and the current presentation unit in a presenting order in the same MPU.

Also, the same number of fields such as "mpu_sequence_number" and "mpu_decoding_time_offset" as the number of MPUs are included. A 32-bit field of "mpu_sequence_number" is a number representing an order of an MPU as described above and is information identifying the MPU. A 16-bit field of "mpu_decoding_time_offset" represents, in time units represented by a timescale, an absolute value of a difference between decoding time of the first presentation unit in a decoding order and presentation time of the first presentation unit in a presentation order in an MPU. That is, this field represents decoding time information of a presentation unit, transmitted first, represented by an offset time length from the presentation time of the first presentation unit.

An eight-bit field of "num_of_au" represents the number of presentation units (access units) forming an MPU. The same number of 16-bit fields of "dts_pts_offset" as the number of the presentation units are included. This field represents time from decoding time to presentation time of a presentation unit in time units represented in a timescale. That is, this field represents presentation time information represented by an offset time length from decoding time of a presentation unit.

Also, when "pts_offset_type" is "2", the same number of 16-bit fields of "pts_offset" as the number of presentation units are included. This field represents, in time units represented by a timescale, a difference in presentation time between an immediately preceding presentation unit and the current presentation unit in a presenting order in the same MPU. That is, this field represents a presentation unit time length for each presentation unit.

Figure 14:
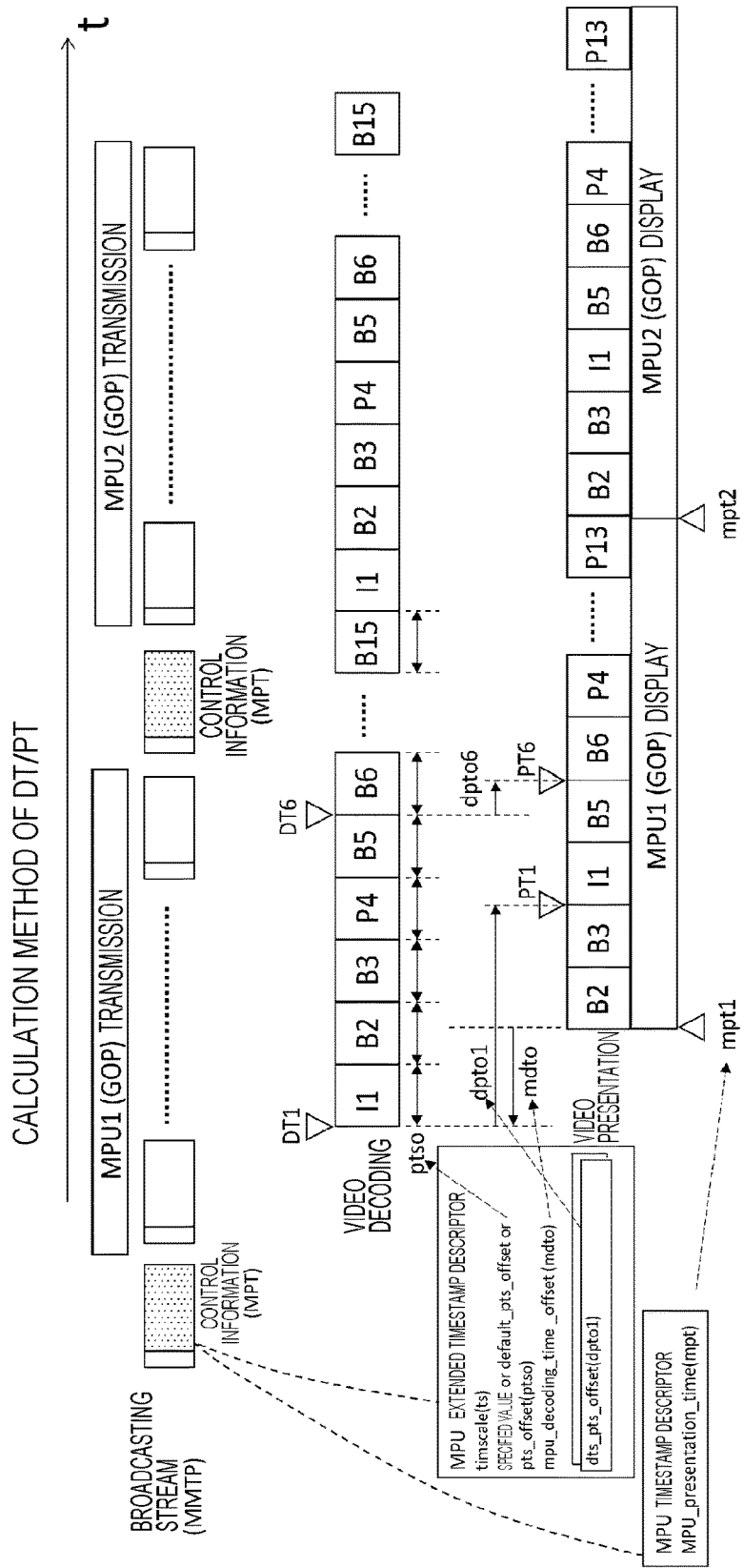
FIG. 14 is a diagram illustrating a calculation method of decoding time DT and presentation time PT on a reception side.

FIG. 14 is a diagram illustrating a calculation method of decoding time DT and presentation time PT on a reception side. As illustrated in the drawing, presentation time mpt of the first presentation unit is acquired from a field of "MPU_presentation_time" of an MPU timestamp descriptor included in an MP table as a signaling message.

Also, decoding time information mdto of a presentation unit (access unit) transmitted first is acquired from a field of "mpu_decoding_time_offset" of an MPU extended timestamp descriptor included in an MP table as a signaling message. Furthermore, presentation time information dpto for each presentation unit (sample) is acquired from the field of "dts_pts_offset" of the descriptor.

Also, information representing time length for each presentation unit ptso is acquired on the basis of description information of the descriptor. That is, in a case where "pts_offset_type" is "0", the information representing time length for each presentation unit ptso is a fixed value specified in advance. Alternatively, in a case where "pts_offset_type" is "1", the information representing time length for each presentation unit ptso is acquired from a field of "default_pts_offset". Further alternatively, in a case where "pts_offset_type" is "2", the information representing time length for each presentation unit ptso is acquired from a field of "pts_offset".

Figure 15:
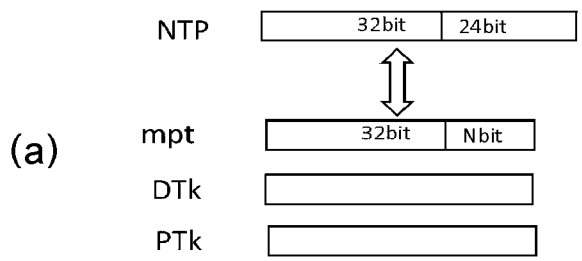
FIGS. 15(a) and 15(b) are diagrams illustrating calculation formulas of decoding time DT and presentation time PT of each presentation unit.

On the reception side, decoding time DTk and presentation time PTk of each presentation unit are calculated from the following mathematical formulas (1), (2), and (3) on the basis of the information acquired as illustrated in FIG. 15(b).

$$DTk = mpt + ((k-1)*ptso - mdto)*2^N/ts \quad (1)$$

$$DTk = mpt + (\Sigma ptsoi - mdto)*2^N/ts \quad (2)$$

$$PTk = DTk + dptok*2^N/ts \quad (3)$$

Note that mathematical formula (1) is a calculation formula of decoding time DTk for each presentation unit in a case where "pts_offset_type" is "0" or "1". Also, mathematical formula (2) is a calculation formula of decoding time DTk for each presentation unit in a case where "pts_offset_type" is "2". Here, a term "Σptsoi" equals zero where k=1 and equals a sum where i=1. . . k−1 where k>1.

Moreover, each of the calculation formulas provide DTk or PTk in a state matched with a unit of presentation time mpt of the first presentation unit acquired from a field of "mpu_presentation_time" of an MPU timestamp descriptor, that is, 1/(2\*\*N) seconds (see FIG. 15(a)). In each formula, in the term "$2^N$/ts" conversion for matching a unit represented by a "timescale" with a unit of mpt is performed.

On the reception side, decoding and presentation control of each presentation unit of transmission media is performed with time information (NTP) generated on the basis of time information transmitted from a transmission side (described later) and decoding time DTk and presentation time PTk calculated in the above manner (see FIG. 15(a)).

Figure 16:
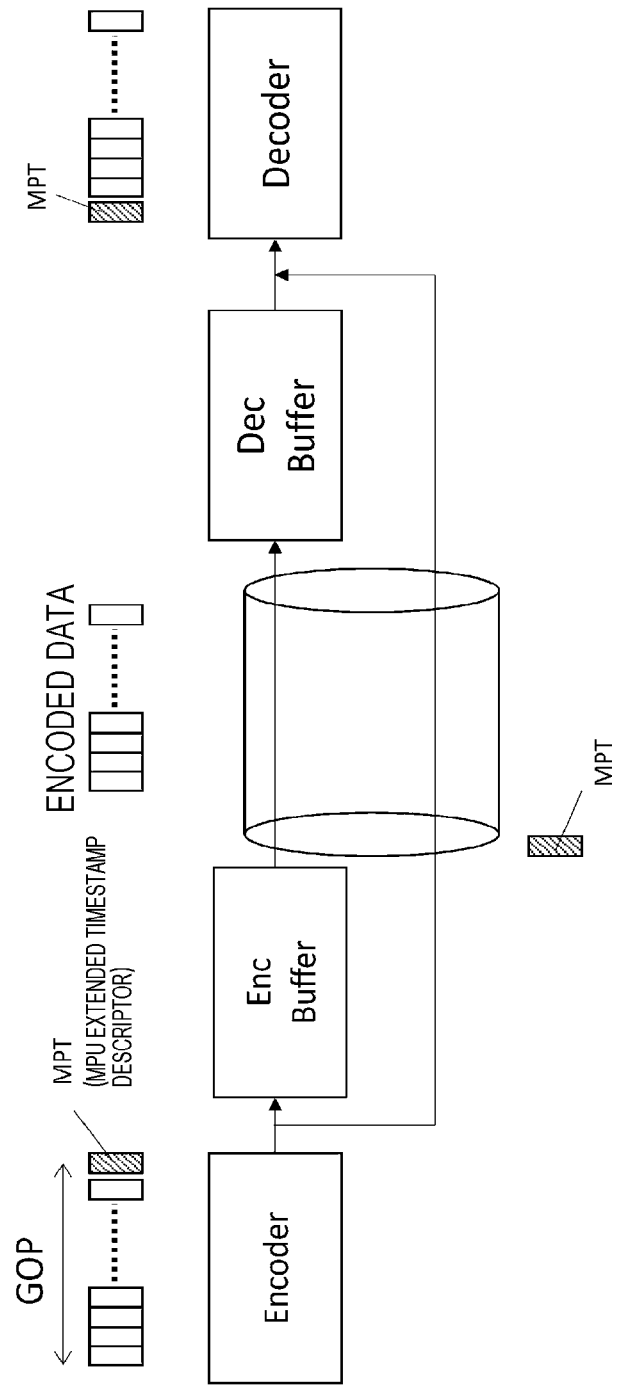
FIG. 16 is a diagram for explaining delay adjustment of a MPT and an AV encoded data to which an MPU extended timestamp descriptor is inserted.

An order of transmission of an MPU extended timestamp descriptor will be described. Unlike an MPU timestamp descriptor arranged before AV data of an MPU, an MPU extended timestamp descriptor is arranged in an MPT immediately when DT/PT is determined before an AV signal is input to an encoder buffer (Enc Buffer) and transmitted in a broadcasting stream as illustrated in FIG. 16.

Assuming that AV data is delayed by the same or more length as that of a GOP in the buffer, the MPU extended timestamp descriptor does not have the above delay and thus it is possible to ensure that DT/PT information can be used by a receiver upon output from a decoder buffer (Dec Buffer).

As described above, transmitting by inserting the DT/PT information in the MPU extended time stamp descriptor enables immediately calculating decoding time and presentation time of each presentation unit in accordance with reception of data of the presentation unit (sample) without delaying data of MPU. This allows a reception side to suppress delay for performing processing by decoding time and presentation time.

[Method for Suppressing Influence on Reception Side by Occurrence of Leap Second]

Next, a method for suppressing influence on a reception side by occurrence of a leap second will be described. First, influence on a reception side by occurrence of a leap second will be described. A leap second occurs once in several years. Occurrence of a leap second has two types, which are insertion (addition) of a leap second and deletion of a leap second. For example, NTP data acquired from the NTP server includes a leap second indicator that commands occurrence of a leap second.

FIG. 17 is a diagram illustrating an exemplary structure (syntax) of NTP data (Network_Time_Protocol_Data). A two-bit field of "leap_indicator" is a leap second indicator representing insertion or deletion of a leap second in the last minute of the current month. This leap second indicator is encoded according to FIG. 18(a). A value "0" represents no warning, "1" represents that the last minute includes 61 seconds, "2" represents that the last minute includes 59 seconds, and "3" represents a warning.

The three-bit field of "mood" represents an operation mode of an NTP and is encoded according to FIG. 18(b). For example, "4" represents a server mode and "5" represents a broadcast mode. The 64-bit field of "transit_timestamp" is absolute time information to be transmitted and is represented in an NTP long format.

As described above, a leap second is inserted in or deleted from the last minute of the current month. Specifically, 23:59:59 is inserted in or deleted. NTP represents coordinated universal time (UTC), that is, Greenwich Mean Time and the above 23:59:59 refers to 8:59:59 in Japan. In the description below, a case in Japan will be described as an example. That is, insertion or deletion of a leap second is described assuming that 08:59:59 is inserted or deleted. As such, occurrence time of a leap second in Japan is immediately before 9 o'clock a.m. and thus influence on viewing is considered substantial.

Influence on a reception side due to occurrence of a leap second includes influence on operation of MMTP packets. FIGS. 19(a) to 19(c) illustrate insertion of a leap second. FIG. 19(a) illustrates absolute time information of an NTP on a transmission side. FIG. 19(b) illustrates an MMTP packet generated on a transmission side by a rectangular frame. Also, a number added to the rectangular frame is a packet sequence number (packet_sequence_number) and represents a sequence number of an MMTP packet having the same packet ID (packet_id) (see FIG. 5(a)).

In each MMTP packet, absolute time information illustrated in FIG. 19(a) is referred to and a timestamp is added (see FIG. 5(a)). In this case, MMTP packets of "3", "4", "5", and "6" are added with a timestamp giving "8:59:59" for a part preceding seconds.

FIG. 19(c) illustrates a state where a timestamp is referred to on a reception side and received MMTP packets are rearranged. In this case, packets transmitted from a transmission side in the order to "3", "4", "5", and "6" are rearranged for example to "3", "5", "6", and "4". That is, a disadvantage due to change of an order of packets may occur on the reception side.

FIGS. 20(a) to 20(c) illustrate deletion of a leap second. FIG. 20(a) illustrates absolute time information of an NTP on a transmission side. FIG. 20(b) illustrates an MMTP packet generated on a transmission side by a rectangular frame. Also, a number added to the rectangular frame is a packet sequence number (packet_sequence_number) and represents a sequence number of an MMTP packet having the same packet ID (packet_id) (see FIG. 5(a)).

In each MMTP packet, absolute time information illustrated in FIG. 20(a) is referred to and a timestamp is added (see FIG. 5(a)). FIG. 20(c) illustrates a state where a timestamp is referred to on a reception side and received MMTP packets are rearranged. In this case, packets transmitted from the transmission side in the order to "3", "4", "5", and "6" stay in the same order even after rearrangement. Therefore, unlike the case of inserting a leap second as described above, no disadvantage due to a change in an order of packets occurs.

Also, influence on the reception side due to occurrence of a leap second includes influence on operation of video MPUs. FIGS. 21(a) to 21(e) illustrate insertion of a leap second. FIG. 21(a) illustrates absolute time information of an NTP on a transmission side. FIG. 21(b) illustrates a value of a leap second indicator (leap_indicator). In this case, the leap second indicator is "01" until "9:00:00" when insertion of a leap second is terminated and turns "00" thereafter.

FIG. 21(c) illustrates a video MPU generated on the transmission side by a rectangular frame. Here, it is assumed that a video MPU corresponds to one GOP (0.5 seconds). A number added to the rectangular frame is an MPU sequence number (mpu_sequence_number) and represents an order of the MPU (see FIG. 6(a)).

Absolute time information illustrated in FIG. 21(a) is referred to in accordance with each video MPU and thereby presentation time (mpu_presentation_time) of a presentation unit (access unit) in the head is set. This presentation time is described in an MPU timestamp descriptor of an MP table as described above (see FIG. 11).

This presentation time is, for example, absolute time corresponding to a presentation unit in the head of a video MPU added with a delay due to an encode buffer and a decode buffer as an offset. In the example illustrated, for example assuming that each of a delay by the encode buffer and the decode buffer is one second, an offset of two seconds is added. In this case, video MPUs of "5", "6", "7", and "8" are added with presentation time giving "9:00:00" for a part preceding seconds.

FIG. 21(d) illustrates a video MPU received on a reception side. In this case, there is a delayed by one second due to the delay of the encode buffer. FIG. 21(e) illustrates a display timing of a video MPU.

Here, video MPUs of "1" and "2" are set with presentation time of "8:59:59" and are thus presented at initial time "8:59:59". Also, video MPUs of "3" and "4" are set with presentation time of "9:00:00" and are thus presented at time "9:00:00". That is, presentation of a video MPU at second time "8:59:59" is omitted. Also, video MPUs of "5", "6", "7", and "8" are set with presentation time of "9:00:01" and thus duplication of presentation of the video MPUs at "9:00:01" occurs.

FIGS. 22(a) to 22(e) illustrate deletion of a leap second. FIG. 22(a) illustrates absolute time information of an NTP on a transmission side. FIG. 22(b) illustrates a value of a leap second indicator (leap_indicator). In this case, the leap second indicator is "10" until "9:00:00" when deletion of a leap second is terminated and turns "00" thereafter.

FIG. 22(c) illustrates a video MPU generated on the transmission side by a rectangular frame. Here, it is assumed that a video MPU corresponds to one GOP (0.5 seconds). A number added to the rectangular frame is an MPU sequence number (mpu_sequence_number) and represents an order of the MPU (see FIG. 6(a)).

Absolute time information illustrated in FIG. 22(a) is referred to in accordance with each video MPU and thereby presentation time (mpu_presentation_time) of a presentation unit (access unit) in the head is set. This presentation time is described in an MPU timestamp descriptor of an MP table as described above (see FIG. 11).

This presentation time is, for example, absolute time corresponding to a presentation unit in the head of a video MPU added with a delay due to an encode buffer and a decode buffer as an offset. In the example illustrated, for example assuming that each of a delay by the encode buffer and the decode buffer is one second, an offset of two seconds is added.

FIG. 22(d) illustrates a video MPU received on a reception side. In this case, there is a delayed by one second due to the delay of the encode buffer. FIG. 22(e) illustrates a display timing of a video MPU.

Here, video MPUs of "1" and "2" are set with presentation time of "8:59:58" and are thus presented at time "8:59:58". Also, video MPUs of "3" and "4" are set with presentation time of "8:59:59", however, presentation cannot be made since there is no corresponding time. Moreover, video MPUs of "5" and "6" are set with presentation time of "9:00:00" and are thus presented at time "9:00:00". Furthermore, video MPUs of "7" and "8" are set with presentation time of "9:00:02" and are thus presented at time "9:00:02". That is, presentation of a video MPU at time "9:00:01" is omitted.

Next, a method for suppressing influence on a reception side by occurrence of a leap second will be described.

[First Method]

First, a first method will be described. Upon generating absolute time information synchronized with absolute time information acquired from an external source, the broadcasting sending system 100 shifts occurrence time of a leap second to shifted time, for example to time when influence on viewing is small. For example, shifted time may be time when still video is transmitted as transmission media in the midnight.

Moreover, in a shifted state of occurrence time of a leap second, the broadcasting sending system 100 transmits the absolute time information while adding mode information representing as being in this state. In this embodiment, a field of "mood" of NTP data is used as this mode information. That is, as illustrated in FIG. 18(b), "7" is newly defined as representing a broadcast leap second shift mode.

This mode information is modified from the broadcast leap second shift mode to a normal state, that is, the broadcast mode a certain period of time prior to shifted time. This is for enabling a reception side to recognize the shifted time in advance and to promptly prepare for occurrence of a leap second.

The receiver 200 can be avoided from being influenced by the original occurrence time of a leap second since occurrence time of a leap second is shifted in the broadcasting sending system 100 as described above. Moreover, the receiver 200 can recognize the shifted time in advance on the basis of the mode information and promptly perform occurrence of a leap second after the shifted time, for example.

FIGS. 23(a) to 23(d) illustrate an exemplary method of the broadcasting sending system 100 regarding insertion of a leap second. FIG. 23(a) illustrates absolute time information in a clock of the broadcasting sending system 100. In this case, insertion of a leap second is shifted from original "8:59:59" to "2:59:59" in the midnight. This shifted time is included, for example, in a transmission period of still video when no program is broadcast as illustrated in FIG. 23(d).

FIG. 23(c) illustrates a value of a leap second indicator (leap_indicator). In this case, the leap second indicator is "01" until "3:00:00" when insertion of a leap second is terminated and turns "00" thereafter. That is, the reception side cannot recognize shifted time in advance with this leap second indicator.

FIG. 23(b) illustrates an NTP operation mode. In this example, the broadcast leap second shift mode is changed to the broadcast mode one second prior to insertion time of a leap second after shifting. In this case, the reception side can recognize the shifted timed in advance by one second.

FIGS. 24(a) to 24(d) illustrate an exemplary method of the broadcasting sending system 100 regarding deletion of a leap second. FIG. 24(a) illustrates absolute time information in a clock of the broadcasting sending system 100. In this case, deletion of a leap second is shifted from original "8:59:59" to "2:59:59" in the midnight. This shifted time is included, for example, in a transmission period of still video when no program is broadcast as illustrated in FIG. 24(d).

FIG. 24(c) illustrates a value of a leap second indicator (leap_indicator). In this case, the leap second indicator is "10" until "3:00:00" when deletion of a leap second is terminated and turns "00" thereafter. That is, the reception side cannot recognize shifted time in advance with this leap second indicator.

FIG. 24(b) illustrates an NTP operation mode. In this example, the broadcast leap second shift mode is changed to the broadcast mode one second prior to deletion time of a leap second after shifting. In this case, the reception side can recognize the shifted timed in advance by one second.

[Second Method]

Next, a second method will be described. Upon generating absolute time information synchronized with absolute time information acquired from an external source, unlike the first method described above, the broadcasting sending system 100 does not shift occurrence time of a leap second. Alternatively, the broadcasting sending system 100 transmits identification information that identifies the first presentation unit group referring to absolute time information after occurrence of a leap second together with transmission media and other data.

In this embodiment, an MPU extended timestamp descriptor is newly defined with a leap second control signal (leap_control) forming identification information using a reserved bit thereof. FIG. 25 illustrates an exemplary structure (syntax) of an MPU extended timestamp descriptor (MPU_Timestamp_Descriptor) newly defined with a leap second control signal.

A three-bit field of "leap_control" represents a leap second control signal. This leap second control signal is encoded according to FIG. 26. In this case, bit 2 "b2" is given "1" representing a timestamp based on a clock by a reception NTP. Furthermore, bits 1, 0 "b1b0" are defined to have the following meaning. That is, "01" represents an MPU set with presentation time (PTS) on the basis of insertion time of a leap second. A value "10" represents an MPU set with presentation time (PTS) on the basis of deletion time of a leap second. A value "11" represents a normal MPU.

Upon generating absolute time information synchronized with the absolute time information included in the broadcasting signal, the receiver 200 generates the absolute time information on a continuous time axis even at the occurrence time of the leap second. In this case, a clock of the receiver 200 is kept shifted but is reset for example upon switching to another channel, in a case where power is turned off or the like. A problem with occurrence of a leap second is a case where processing of the same channel continues while interposing the leap second and thus being reset by switching channels is not a problem.

Furthermore, the receiver 200 adjusts presentation time of each MPU after from and after the first MPU (presentation unit group) referring to absolute time information after occurrence of a leap second on the basis of the leap second control signal described above. Specifically, one second is added to each presentation time when occurrence of a leap second is insertion of the leap second and one second is subtracted from each presentation time when occurrence of a leap second is deletion of the leap second The receiver 200 can suppress influence on presentation synchronization processing of each presentation unit group even with occurrence of a leap second by generating absolute time information on a continuous time axis even at occurrence time of a leap second as described above and adjusting presentation time on the basis of a leap second control signal.

Figure 27:
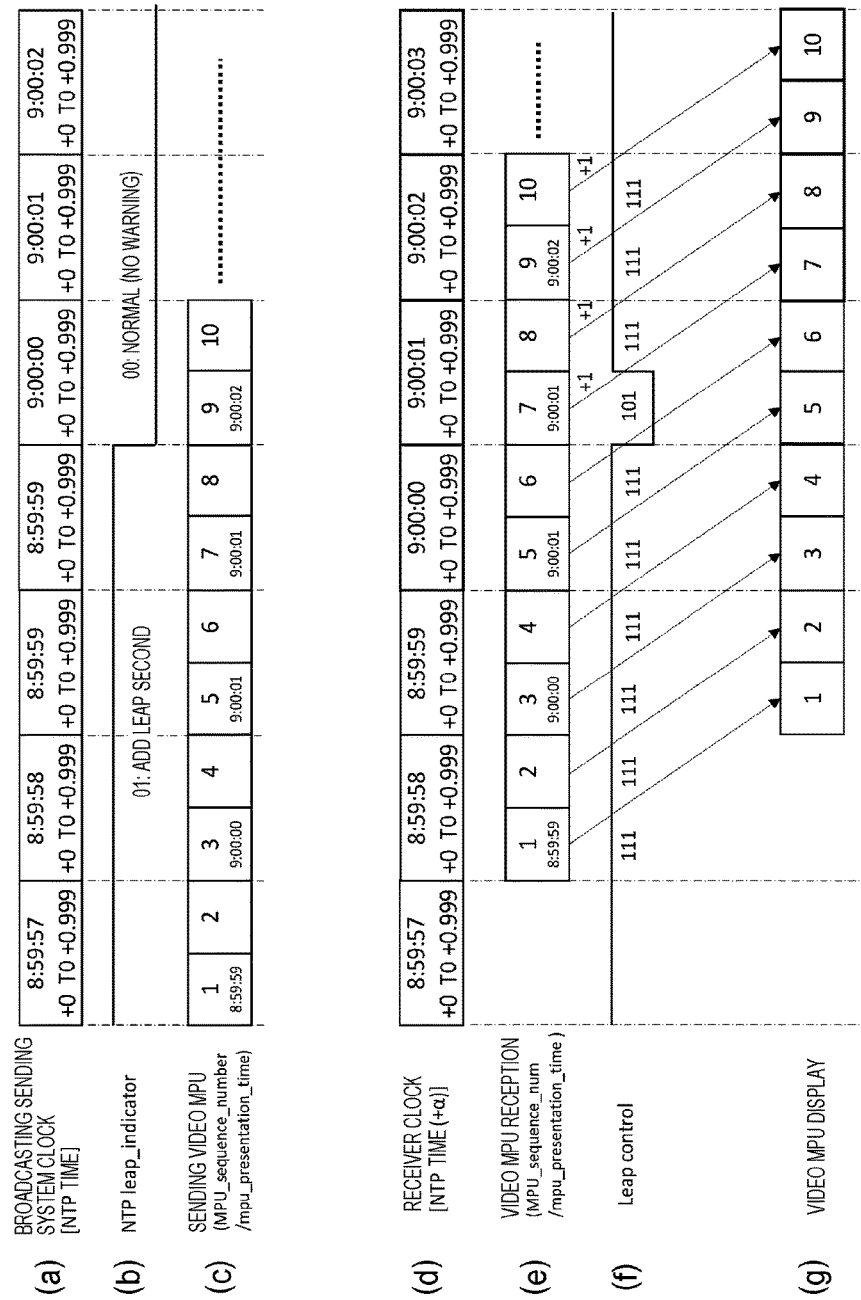
FIGS. 27(a) to 27(g) are diagrams illustrating exemplary MPU presentation synchronization processing when a leap second is inserted.

FIGS. 27(a) to 27(g) illustrate exemplary MPU presentation synchronization processing when a leap second is inserted. FIG. 27(a) illustrates absolute time information (NTP time) in a clock of the broadcasting sending system 100. A leap second is inserted. FIG. 27(b) illustrates a value of a leap second indicator (leap_indicator). In this case, the leap second indicator is "01" until "9:00:00" when insertion of a leap second is terminated and turns "00" thereafter.

FIG. 27(c) illustrates a video MPU generated by the broadcasting sending system 100 by a rectangular frame. Here, it is assumed that a video MPU corresponds to one GOP (0.5 seconds). A number added to the rectangular frame is an MPU sequence number (mpu_sequence_number) and represents an order of the MPU (see FIG. 6(a)).

Absolute time information illustrated in FIG. 27(a) is referred to in accordance with each video MPU and thereby presentation time (mpu_presentation_time) of a presentation unit (access unit) in the head is set. This presentation time is described in an MPU timestamp descriptor of an MP table as described above (see FIG. 11).

This presentation time is, for example, absolute time corresponding to a presentation unit in the head of a video MPU added with a delay due to an encode buffer and a decode buffer as an offset. In the example illustrated, for example assuming that each of a delay by the encode buffer and the decode buffer is one second, an offset of two seconds is added.

FIG. 27(d) illustrates absolute time information (NTP time+α) as a clock of the receiver 200. This absolute time information is generated on a continuous time axis even at the occurrence time of the leap second. That is, "8:59:59" is followed by "9:00:00". FIG. 27(d) illustrates a video MPU received by the receiver 200. In this case, there is a delayed by one second due to the delay of the encode buffer.

FIG. 27(f) illustrates a leap second control signal (leap_control) corresponding to each of the video MPUs received. This leap second control signal is "111" until a video MPU of "6". However, at a video MPU of "7" that is the first video MPU referring to the absolute time information after occurrence of a leap second, the leap second control signal is "101". Then after a video MPU of "8" and on, the signal is again turned to "111".

FIG. 27(g) illustrates a display timing of a video MPU. Here, video MPUs of "1" and "2" are set with presentation time of "8:59:59" and are thus presented at time "8:59:59". Also, video MPUs of "3" and "4" are set with presentation time of "9:00:00" and are thus presented at time "9:00:00". Furthermore, video MPUs of "5" and "6" are set with presentation time of "9:00:00" and are thus presented at time "9:00:00".

Then, the leap second control signal is turned to "101" in accordance with a video MPU of "7", thus representing that it is the first video MPU referring to absolute time information after occurrence (insertion) of a leap second. Thus, presentation time of video MPUs from and after "7" is added with one second. Therefore, although video MPUs of "7" and "8" are set with presentation time of "9:00:00", they are adjusted to "9:00:02" and are presented at time "9:00:02". Moreover, although video MPUs of "9" and "10" are set with presentation time of "9:00:02", they are adjusted to "9:00:03" and are presented at time "9:00:03". The same applies hereinafter.

In this manner, in the receiver 200, presentation synchronization processing is appropriately performed without occurrence of omission or overlapping of presentation of a video MPU. Note that, only at the MPU of "7" the leap second control signal is turned to "101" in the present example; however, a plurality of MPUs after "7" may be provided with "101" considering reception error.

Figure 28:
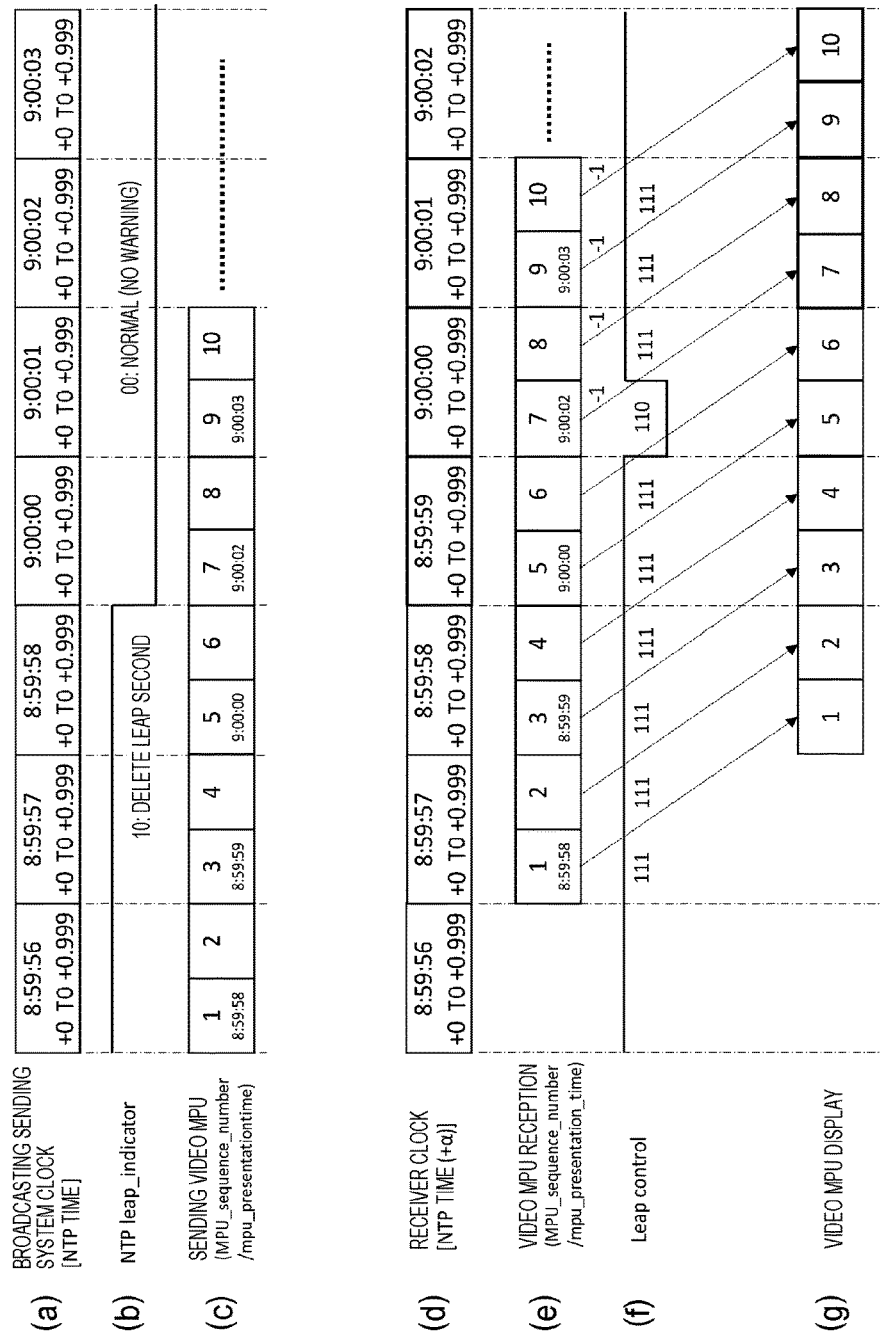
FIGS. 28(a) to 28(g) are diagrams illustrating exemplary MPU presentation synchronization processing when a leap second is deleted.

FIGS. 28(a) to 28(g) illustrate exemplary MPU presentation synchronization processing when a leap second is deleted. FIG. 28(a) illustrates absolute time information (NTP time) as a clock of the broadcasting sending system 100. A leap second is deleted. FIG. 28(b) illustrates a value of a leap second indicator (leap_indicator). In this case, the leap second indicator is "10" until "9:00:00" when deletion of a leap second is terminated and turns "00" thereafter.

FIG. 28(c) illustrates a video MPU generated by the broadcasting sending system 100 by a rectangular frame. Here, it is assumed that a video MPU corresponds to one GOP (0.5 seconds). A number added to the rectangular frame is an MPU sequence number (mpu_sequence_number) and represents an order of the MPU (see FIG. 6(a)).

Absolute time information illustrated in FIG. 28(a) is referred to in accordance with each video MPU and thereby presentation time (mpu_presentation_time) of a presentation unit (access unit) in the head is set. This presentation time is described in an MPU timestamp descriptor of an MP table as described above (see FIG. 11).

This presentation time is, for example, absolute time corresponding to a presentation unit in the head of a video MPU added with a delay due to an encode buffer and a decode buffer as an offset. In the example illustrated, for example assuming that each of a delay by the encode buffer and the decode buffer is one second, an offset of two seconds is added.

FIG. 28(d) illustrates absolute time information (NTP time+α) as a clock of the receiver 200. This absolute time information is generated on a continuous time axis even at the occurrence time of the leap second. That is, "8:59:58" is followed by "8:59:59". FIG. 28(e) illustrates a video MPU received by the receiver 200. In this case, there is a delayed by one second due to the delay of the encode buffer.

FIG. 28(f) illustrates a leap second control signal (leap_control) corresponding to each of the video MPUs received. This leap second control signal is "111" until a video MPU of "6". However, at a video MPU of "7" that is the first video MPU referring to the absolute time information after occurrence of a leap second, the leap second control signal is "110". Then after a video MPU of "8" and on, the signal is again turned to "111".

FIG. 28(g) illustrates a display timing of a video MPU. Here, video MPUs of "1" and "2" are set with presentation time of "8:59:58" and are thus presented at time "8:59:58". Also, video MPUs of "3" and "4" are set with presentation time of ""8:59:59" and are thus presented at time ""8:59:59". Moreover, video MPUs of "5" and "6" are set with presentation time of "9:00:00" and are thus presented at time "9:00:00".

Then, the leap second control signal is turned to "110" in accordance with a video MPU of "7", thus representing that it is the first video MPU referring to absolute time information after occurrence (deletion) of a leap second. Thus, presentation time of video MPUs from and after "7" is subtracted of one second. Therefore, although video MPUs of "7" and "8" are set with presentation time of "9:00:02", they are adjusted to "9:00:01" and are presented at time "9:00:01". Therefore, although video MPUs of "9" and "10" are set with presentation time of "9:00:03", they are adjusted to "9:00:02" and are presented at time "9:00:02". The same applies hereinafter.

In this manner, in the receiver 200, presentation synchronization processing is appropriately performed without omission of presentation of a video MPU or missing of corresponding time. Note that, only at the MPU of "7" the leap second control signal is turned to "110" in the present example; however, a plurality of MPUs after "7" may be provided with "110" considering reception error.

Figure 29:
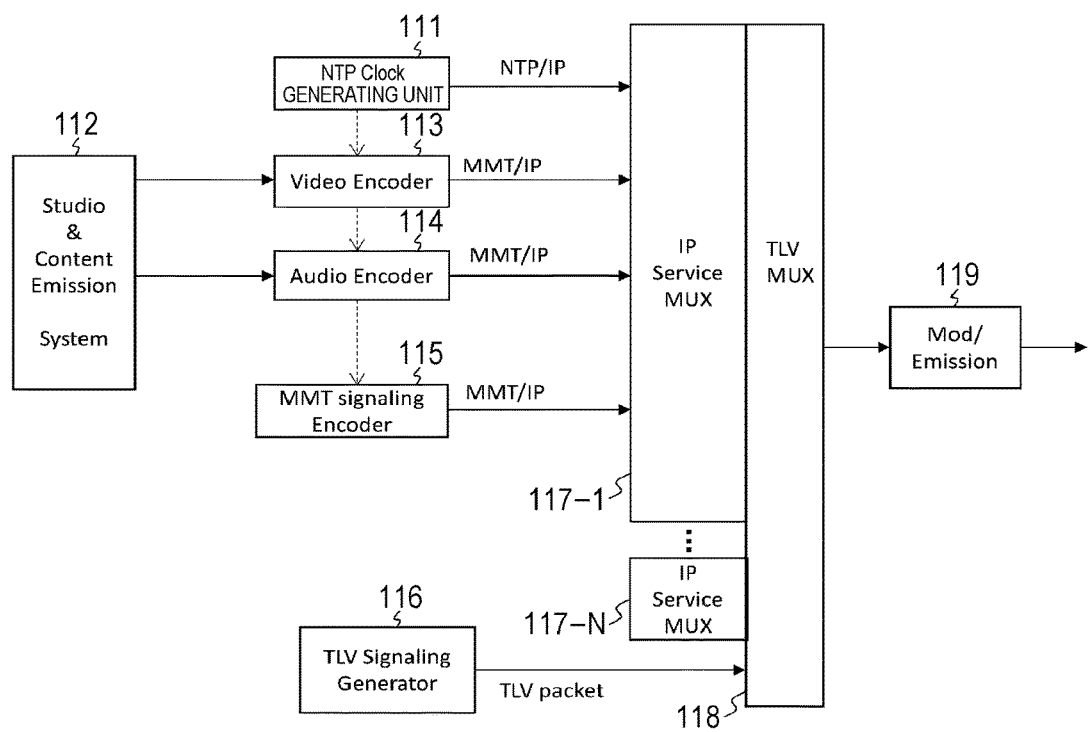
FIG. 29 is a block diagram illustrating an exemplary configuration of a broadcasting sending system.

FIG. 29 illustrates an exemplary configuration of the broadcasting sending system 100. This broadcasting sending system 100 has an NIP clock generating unit (clock unit) 111, a signal sending unit 112, a Video encoder 113, an audio encoder 114, and an MMT signaling encoding unit 115. The broadcasting sending system 100 further has a TLV signaling generating unit 116, NIP service multiplexers 117-1 to 117-N, a TLV multiplexer 118, and a modulation/transmission unit 119.

In the NTP clock generating unit (clock unit) 111, NTP data having absolute time information synchronized with NTP time information acquired from an external source is generated and an IP packet including this NTP data is transmitted to the IP service multiplexer 117-1. In a case where the first method is employed, occurrence time of a leap second is shifted to shifted time in the NTP clock generating unit (clock unit) 111. Moreover, in a shifted state of occurrence time of a leap second, the field of "mood" of NTP data is used and mode information representing as being in this state is added to the absolute time information.

The signal sending unit 112 is a system for transmitting a baseband signal such as video and audio as transmission media, for example, a studio of a TV station or recording reproducing device such as a VTR. In the video encoder 113, a video signal transmitted from the signal sending unit 112 is encoded and further packetized and an IP packet including an MMTP packet of video is transmitted to the IP service multiplexer 117-1. In the audio encoder 114, an audio signal transmitted from the signal sending unit 112 is encoded and further packetized and an IP packet including an MMTP packet of audio is transmitted to the IP service multiplexer 117-1.

In the MMT signaling encoding unit 115, a signaling message is generated. An IP packet including an MMTP packet arranged with this signaling message in a payload part is transmitted to the IP service multiplexer 117-1. An MP table (MMT Package Table) is included in this signaling message. In this MP table, an MPU timestamp descriptor (MPU_timestamp_descriptor) as well as an MPU extended timestamp descriptor (MPU_extended_timestamp_descriptor) is inserted.

In the MPU timestamp descriptor, presentation time of a presentation unit in the head of an MPU is arranged. Furthermore, time length information for calculating decoding time and presentation time of each presentation unit of an MPU by referring to presentation time of a presentation unit in the head of the MPU is arranged in the MPU extended timestamp descriptor. Moreover, in a case where the second method is employed, a leap second control signal (leap_control) forming identification information identifying the first MPU referring to absolute time information after occurrence of a leap second is arranged in the MPU extended timestamp descriptor.

In the IP service multiplexer 117-1, time division multiplexing is performed on IP packets transmitted from the respective encoders. Upon performing this, each of the IP packets is added with an UDP header and a TLV header and a TLV packet is thereby formed in the IP service multiplexer 117-1. In the IP service multiplexer 117-1, one channel part to enter one transponder is formed. The IP service multiplexers 117-2 to 117-N have a function similar to that of the IP service multiplexer 117-1 and form other channel parts to enter that one transponder.

In the TLV signaling generating unit 116, signaling information is generated and a TLV packet arranged with this signaling information in a payload part is generated. In the TLV multiplexer 118, TLV packets generated by the IP service multiplexers 117-1 to 117-N and the TLV signaling generating unit 116 are multiplexed and a broadcasting stream of the MMT system (see FIG. 4(e)) is generated. In the modulation/transmission unit 119, RF modulation processing is performed on the broadcasting stream of the MMT system generated by the TLV multiplexer 118 and the broadcasting stream is thereby transmitted by an RF transmission path.

Figure 30:
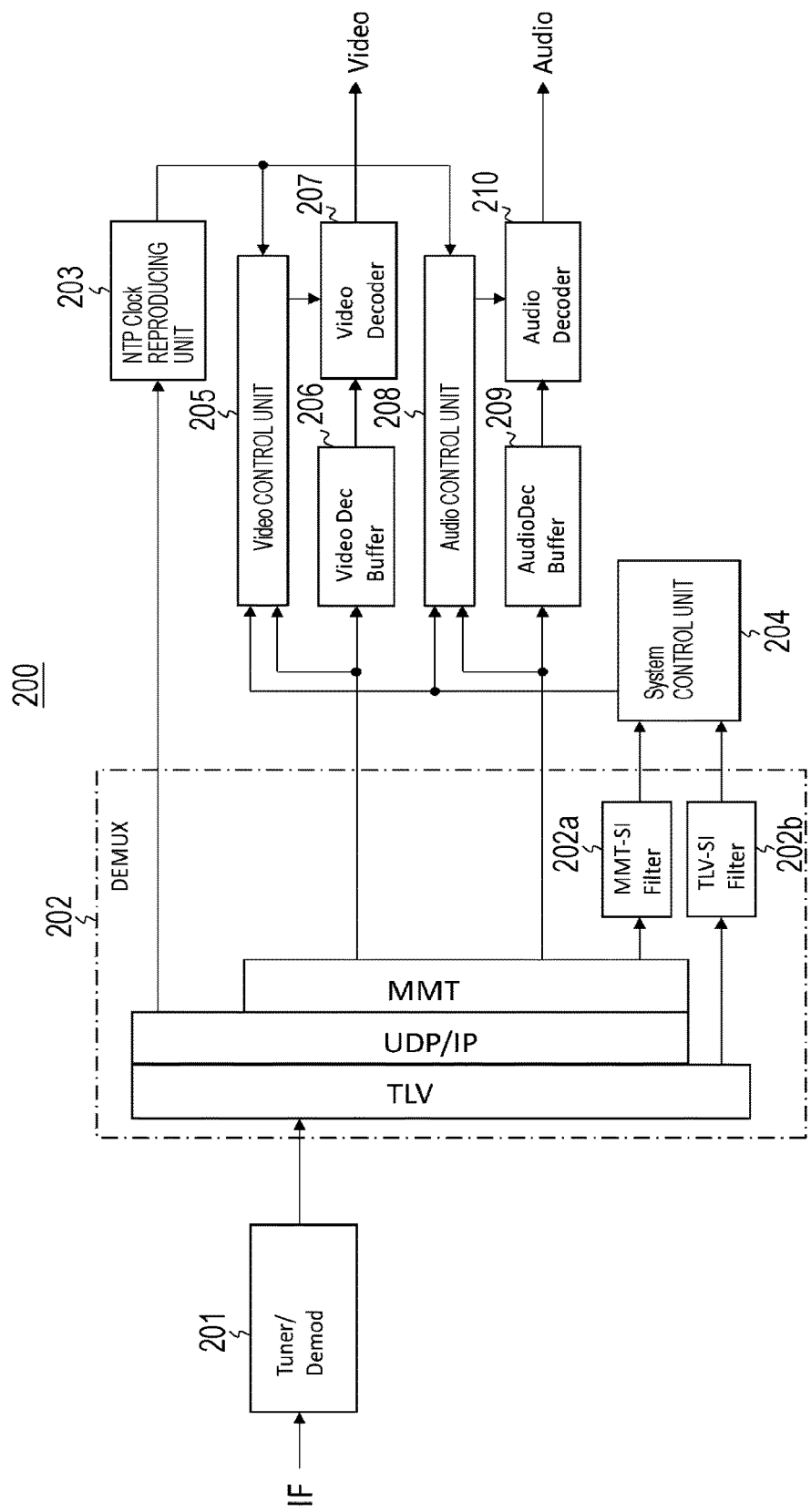
FIG. 30 is a block diagram illustrating an exemplary configuration of a receiver.

FIG. 30 illustrates an exemplary configuration of the receiver 200. The receiver 200 includes a tuner/demodulation unit 201, a demultiplexer 202, an NTP clock reproducing unit (clock unit) 203, and a system control unit 204. The receiver 200 further includes a video control unit 205, a video decode buffer 206, a video decoder 207, an audio control unit 208, an audio decode buffer 209, and an audio decoder 210.

Figure 4:
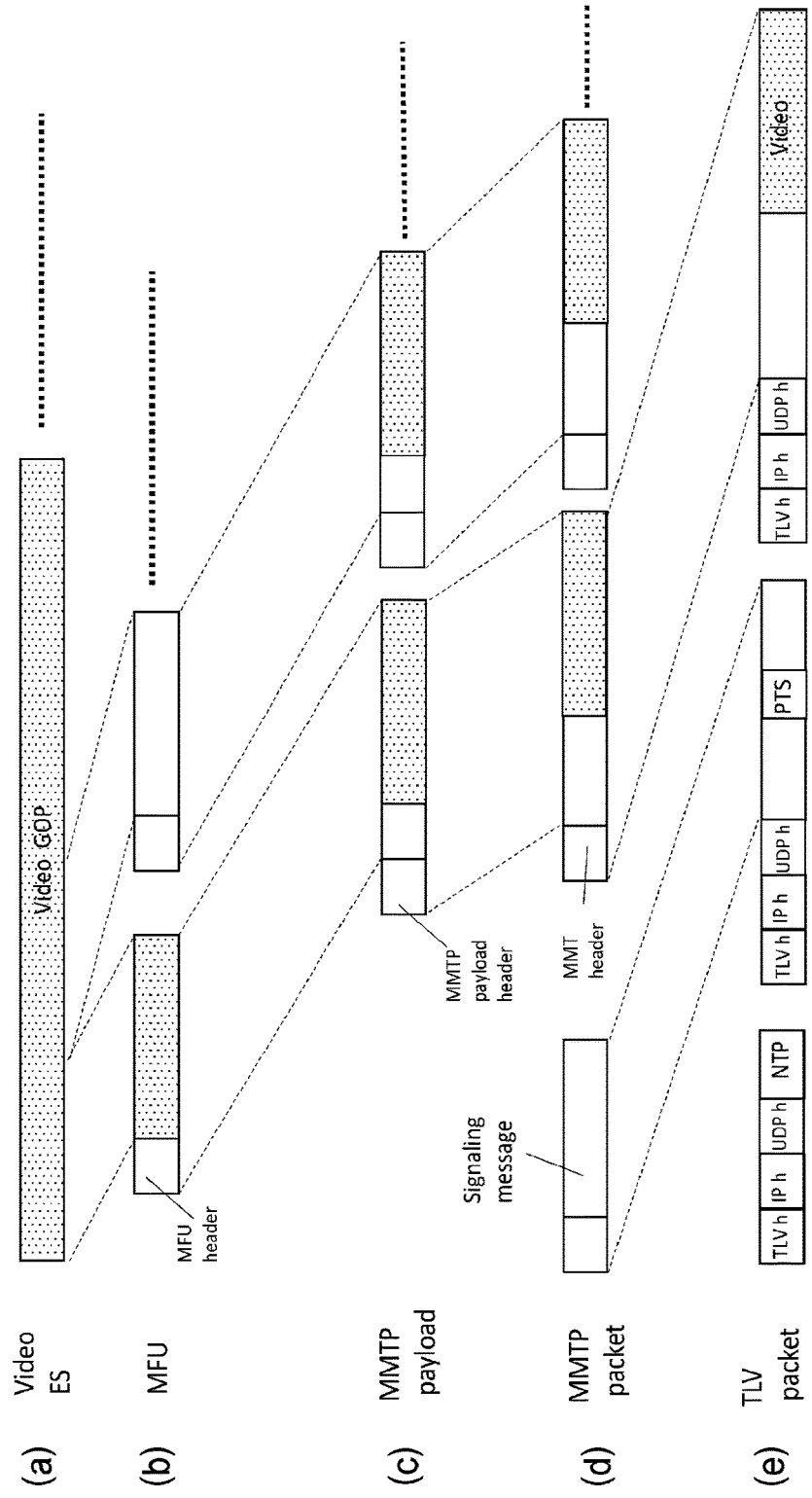
FIGS. 4(a) to 4(e) are diagrams illustrating an exemplary configuration of an MMT system broadcasting stream (broadcasting signal).

In the tuner/demodulation unit 201, an intermediate frequency signal from an antenna not illustrated is received and subjected to demodulation processing, thereby obtaining a broadcasting stream (see FIG. 4(*e*)) of the MMT system. In the demultiplexer 202, demultiplexing processing and de-packetizing processing is performed on this broadcasting stream and NTP time information and signaling information as well as encoded data of video and audio and DT/PT information of the video and the audio are extracted.

In the demultiplexer 202, signaling information (signaling message) of MMT is extracted by filtering in an MMT-SI filter unit 202*a* and sent to the system control unit 204. Moreover in the demultiplexer 202, TLV signaling information is extracted by filtering in a TLV-SI filter unit 202*b* and sent to the system control unit 204.

NTP data extracted in the demultiplexer 202 is sent to the NTP clock reproducing unit 203. In the NTP clock reproducing unit 203, absolute time information synchronized with absolute time information included in the NTP data is reproduced (generated). In a case where the first method is employed, a leap second is generated at shifted time on the basis of mode information. The absolute time information reproduced in this manner is sent to the video control unit 205 and the audio control unit 208. Moreover, in a case where the second method is employed, absolute time information is generated on a continuous time axis even at occurrence time of the leap second.

The encoded data of video extracted in the demultiplexer 202 is temporarily accumulated in the video decode buffer 206. Furthermore, the encoded data of audio extracted in the demultiplexer 202 is temporarily accumulated in the audio decode buffer 209.

In the system control unit 204, presentation time of the first presentation unit of an MPU of the video and audio is extracted from an MPU timestamp descriptor of video and audio of an MP table. The presentation time for video and audio is sent to the video control unit 205 and the audio control unit 208, respectively.

Furthermore in the system control unit 204, time length information for calculating decoding time and presentation time of each presentation unit of an MPU is extracted from the MPU extended timestamp descriptor of video and audio of the MP table by referring to presentation time of a presentation unit in the head of the MPU. The time length information for video and audio is sent to the video control unit 205 and the audio control unit 208, respectively.

Moreover, in a case where the second method is employed, a leap second control signal (leap_control) forming identification information identifying the first MPU referring to absolute time information after occurrence of a leap second is extracted from the MPU extended timestamp descriptor of video and audio of the MP table in the system control unit 204. The leap second control signals for video and audio are sent to the video control unit 205 and the audio control unit 208, respectively.

In the video control unit 205, decoding time DT and presentation time PT for each presentation unit are obtained on the basis of presentation time of the first presentation unit in an MPU and time length information for calculating decoding time and presentation time of each presentation unit of the MPU. In a case where the second method is employed here, presentation time of each MPU is adjusted from and after the first MPU referring to absolute time information after occurrence of a leap second on the basis of the leap second control signal described above.

In the video control unit 205, commands for decoding and presentation are provided, to the video decoder 207, with respect to encoded video of each sample (presentation unit) accumulated in the video decode buffer 206. In this case, in the video control unit 205, NTP time information supplied from the NTP clock reproducing unit 203 is referred to and these commands are provided at the timings of the decoding time DT and the presentation time PT obtained in the manner described above.

In the video decoder 207, decoding processing of encode video of each sample (presentation unit) accumulated in the video decode buffer 206 is performed on the basis of the command from the video control unit 205. Then, video of each sample (presentation unit) is sequentially output at the timing of the presentation time PT from the video decoder 207.

Furthermore in the audio control unit 208, decoding time DT and presentation time PT for each presentation unit are obtained on the basis of presentation time of the first presentation unit in an MPU and time length information for calculating decoding time and presentation time of each presentation unit of the MPU. In a case where the second method is employed here, presentation time of each MPU is adjusted from and after the first MPU referring to absolute time information after occurrence of a leap second on the basis of the leap second control signal described above.

In the audio control unit 208, commands for decoding and presentation are provided, to the audio decoder 210, with respect to encoded audio of each presentation unit accumulated in the audio decode buffer 209. In this case, in the audio control unit 208, NTP time information supplied from the NTP clock reproducing unit 203 is referred to and these commands are provided at the timings of the decoding time DT and the presentation time PT obtained in the manner described above.

In the audio decoder 210, decoding processing of encoded audio of each presentation unit accumulated in the audio decode buffer 209 is performed on the basis of the command from the audio control unit 208. Then, audio of each presentation unit is sequentially output at the timing of the presentation time PT from the audio decoder 210.

As described above, in the transmission/reception system 10 illustrated in FIG. 1, in absolute time information transmitted with transmission media, occurrence time of a leap second is shifted to shifted time. Therefore, arranging the shifted time at time when influence on viewing is small can suppress influence on a reception side by occurrence of a leap second.

Note that, in a case where occurrence time of the leap second is shifted to shifted time in absolute time information transmitted together with transmission media and occurrence time of a leap second is in a shifted state, the absolute time information is added with mode information representing as being in this state in the transmission/reception system 10 illustrated in FIG. 1. Therefore, this mode information allows the reception side to easily recognize that the occurrence time of a leap second is in the shifted state.

Moreover, in the transmission/reception system 10 illustrated in FIG. 1, when occurrence time of the leap second is shifted to shifted time in absolute time information transmitted together with transmission media, mode information added to the absolute time information is modified to represent as being in a normal state a certain period of time prior to the shifted time. Therefore, the reception side can recognize the shifted time in advance and promptly prepare for occurrence of a leap second.

Moreover in the transmission/reception system 10 illustrated in FIG. 1, identification information that identifies the first presentation unit group referring to absolute time information after occurrence of a leap second is transmitted together with transmission media and other data. This allows the reception side to adjust presentation time of each presentation unit group of the transmission media on the basis of the identification information. This can suppress influence by occurrence of a leap second.

<2. Second Embodiment>

[Exemplary Configuration of Transmission/Reception System]

FIG. 31 illustrates an exemplary configuration of a transmission/reception system 10A as a second embodiment. The transmission/reception system 10A is a system of a multistream service (broadcast and communication cooperation) and includes broadcasting sending systems 100A and 100B, a distribution device 100C, and a receiver 200A.

Broadcasting sending systems 100A and 100B transmit a broadcasting signal of the Internet Protocol (IP) system including transmission media such as video and audio. The broadcasting sending system 100A has a clock unit (time information generating unit) 151A which generates absolute time information on the basis of absolute time information acquired from an external source, a video/audio encoder 152A which performs encoding processing on transmission media such as video and audio, and a sending device 153A which transmits the absolute time information (NTP data) generated by the clock unit 151A and the transmission media performed with encoding processing by the video/audio encoder 152A on a broadcasting transmission path.

Although detailed descriptions are omitted, the broadcasting sending system 100A is configured in a similar manner to that of the broadcasting sending system 100 in the transmission/reception system 10 described above. A broadcasting signal includes transmission media as well as the generated absolute time information and presentation time of each presentation unit group formed by a predetermined number of presentation units of transmission media. In order to suppress influence on a reception side due to occurrence of a leap second, the broadcasting sending system 100A performs the first method or the second method similarly to the broadcasting sending system 100 in the transmission/reception system 10 described above.

The broadcasting sending system 100B has a clock unit (time information generating unit) 151B which generates absolute time information on the basis of absolute time information acquired from an external source, a video/audio encoder 152B which performs encoding processing on transmission media such as video and audio, and a sending device 153B which transmits the transmission media performed with encoding processing by the video/audio encoder 152B on a broadcasting transmission path.

Although detailed descriptions are omitted, the broadcasting sending system 100B is configured in a similar manner to that of the broadcasting sending system 100 in the transmission/reception system 10 described above except for that the absolute time information (NTP data) generated in the clock unit 151B is not sent. A broadcasting signal includes transmission media as well as presentation time of each presentation unit group formed by a predetermined number of presentation units of transmission media. In order to suppress influence on a reception side due to occurrence of a leap second, the broadcasting sending system 100B performs the first method or the second method similarly to the broadcasting sending system 100 in the transmission/reception system 10 described above.

Unlike the broadcasting signal from the broadcasting sending system 100 in the transmission/reception system 10 described above, a broadcasting signal in the broadcasting sending system 100B includes time difference information representing time difference between absolute time information of the clock unit (time information generating unit) 151B referred to when presentation time of each presentation unit group is generated and absolute time information of the clock unit (time information generating unit) 151A in the broadcasting sending system 100A.

In a case where methods for suppressing influence on a reception side due to occurrence of a leap second are different or in a case where shifted time is different even though the same first method is employed, a period when advancement or delay of one second occurs as compared to absolute time information of the clock unit 151A occurs in absolute time information of the clock unit 151B. Therefore, it is required to adjust presentation time on the reception side in a case where presentation control of transmission media from the broadcasting sending system 100B is performed on the basis of absolute time information from the clock unit 151A of the broadcasting sending system 100A. The time difference information is used for adjusting this presentation time on the reception side.

The broadcasting sending system 100B newly defines, to an MPU extended timestamp descriptor, a leap second control signal (leap_control) forming time difference information using a reserved bit thereof (see FIG. 25). In this case, the three-bit field of "leap_control" is encoded according to FIG. 26.

That is, bit 2 "b2" is given "0" representing a timestamp based on a clock other than a reception NTP. Furthermore, bits 1, 0 "b1b0" are defined to have the following meaning. That is, "01" represents a timestamp based on a clock advanced by one second as compared to a reception NTP. A value "10" represents a timestamp based on a clock delayed by one second as compared to a reception NTP. A value "11" represents a timestamp based on a clock matched with a reception NTP.

The distribution device 100C has a clock unit (time information generating unit) 151C which generates absolute time information on the basis of absolute time information acquired from an external source, a video/audio encoder 152C which performs encoding processing on transmission media such as video and audio, and a real-time distribution server 153C which transmits the transmission media performed with encoding processing by the video/audio encoder 152C on a communication transmission path such as the Internet.

Although detailed descriptions are omitted, the distribution device 100 is configured in a similar manner to that of the broadcasting sending system 100 in the transmission/reception system 10 described above except for that the absolute time information (NTP data) generated in the clock unit 151B is not sent and that transmission paths are different. A distribution signal includes transmission media as well as presentation time of each presentation unit group formed by a predetermined number of presentation units of transmission media. In order to suppress influence on a reception side due to occurrence of a leap second, the distribution device 100C performs the first method or the second method similarly to the broadcasting sending system 100 in the transmission/reception system 10 described above.

Like the broadcasting signal in the broadcasting sending system 100B described above, a distribution signal in the distribution device 100C includes time difference information representing time difference between absolute time information of the clock unit (time information generating unit) 151C referred to when presentation time of each presentation unit group is generated and absolute time information of the clock unit (time information generating unit) 151A in the broadcasting sending system 100A.

The receiver 200A receives a broadcasting signal transmitted from the broadcasting sending systems 100A and 100B and further receives a distribution signal transmitted from the distribution device 100C. The receiver 200A processes the respective signals in a similar manner to that of the receiver 200 in the transmission/reception system 10 described above.

With respect to transmission media transmitted from the broadcasting sending system 100A, the receiver 200A controls presentation of each presentation unit group (MPU) of the transmission media by referring to absolute time information generated on the basis of absolute time information (NTP data) transmitted from the broadcasting sending system 100A and presentation time of each presentation unit group (MPU) of the transmission media transmitted from the broadcasting sending system 100A. Upon performing this, in order to suppress influence on the reception side due to occurrence of a leap second employed by the broadcasting sending system 100A, the receiver 200A performs a method according to a method (first method or second method).

Furthermore, the receiver 200A also performs basically similar presentation control to that of the transmission media transmitted from the broadcasting sending system 100A on transmission media transmitted from the broadcasting sending system 100B or the distribution device 100C. Note that absolute time information generated on the basis of absolute time information (NTP data) transmitted from the broadcasting sending system 100A is used and that presentation time of each presentation unit group (MPU) of transmitted transmission media is adjusted on the basis of time difference information.

In this case, when time difference information, that is, a field of "leap_contorl" is "001", just one second is subtracted from presentation time for use. Also when time difference information, that is, a field of "leap_contorl" is "010", just one second is added to presentation time for use.

Adjusting the presentation time in this manner allows processing of the transmission media transmitted from the broadcasting sending system 100B and the distribution device 100C to be performed on the basis of absolute time information synchronized with the absolute time information from the broadcasting sending system 100A in a preferable manner. This allows the receiver 200A to perform presentation synchronization of the transmission media transmitted from the broadcasting sending system 100A and the transmission media transmitted from the broadcasting sending system 100B or the distribution device 100C and to perform presentation through synthesis without causing discomfort.

A specific example of the presentation synchronization processing described above in a multistream service will be described. Here, an exemplary case of two streams of a broadcasting stream from the broadcasting sending system 100A and a network distribution stream from the distribution device 100C will be described.

FIGS. 32(a) to 32(h) illustrate exemplary presentation synchronization processing in multistream service 1 in a case where a leap second is inserted. In the case of this example, a broadcasting stream is based on a leap second shift mode while a network distribution stream is based on a normal leap second.

FIG. 32(a) illustrates absolute time information in a clock of the broadcasting sending system 100A. In this case, insertion of a leap second is shifted from original "8:59:59" to "2:59:59" in the midnight. FIG. 32(c) illustrates a value of a leap second indicator (leap_indicator). In this case, the leap second indicator is "01" until "3:00:00" when insertion of a leap second is terminated and turns "00" thereafter.

FIG. 32(b) illustrates an NTP operation mode. In this example, the broadcast leap second shift mode is changed to the broadcast mode one second prior to insertion time of a leap second after shifting. In this case, the reception side can recognize the shifted timed of the leap second in advance by one second.

FIG. 32(d) illustrates an MPU (broadcasting MPU) received by the receiver 200A by a rectangular frame. This MPU is in a state delayed by one second due to the delay of the encode buffer, for example. Furthermore, FIG. 32(e) illustrates a leap second control signal (leap_control) as identification information corresponding to each of the received MPUs. This leap second control signal is "101" in the first MPU referring to the absolute time information after occurrence of a leap second and then turns "111" in other MPUs.

FIG. 32(f) illustrates absolute time information in a clock of the distribution device 100C. In this case, insertion of a leap second is performed at original "8:59:59". FIG. 32(g) illustrates an MPU (network distribution MPU) received by the receiver 200A by a rectangular frame. This MPU is in a state delayed by one second due to the delay of the encode buffer, for example.

FIG. 32(h) illustrates a leap second control signal (leap_control) as time difference information corresponding to each of the received MPUs. Regarding absolute time information in the clock of the broadcasting sending system 100A (see FIG. 32(a)) and absolute time information in the clock of the distribution device 100C (see FIG. 32(f)), absolute time information in the clock of the distribution device 100C is delayed by just one second from absolute time information in the clock of the broadcasting sending system 100A during a period from the second "8:59:59" to "2:59:58" related to insertion of a leap second in the absolute time information in the clock of the distribution device 100C.

Therefore, a leap second control signal (leap_control) as time difference information in FIG. 32(h) is turned to "010" in MPUs corresponding to the period while turned to "011" in other MPUs (see FIG. 26). Therefore, the receiver 200A can perform presentation synchronization of transmission media from both of the broadcasting sending system 100A and the distribution device 100C by adjusting presentation time of each presentation unit group of transmission media from the distribution device 100C on the basis of the leap second control signal (leap_control) as time difference information.

FIGS. 33(a) to 33(h) illustrate exemplary presentation synchronization processing in multistream service 2 in a case where a leap second is inserted. In the case of this example, a broadcasting stream is based on a normal leap second while a network distribution stream is based on the leap second shift mode.

FIG. 33(a) illustrates absolute time information in a clock of a broadcasting sending system 100A. In this case, insertion of a leap second is performed at original "8:59:59". FIG. 33(c) illustrates a value of a leap second indicator (leap_indicator). In this case, the leap second indicator is "01" until "9:00:00" when insertion of a leap second is terminated and turns "00" thereafter. FIG. 33(b) illustrates an NTP operation mode. In this example, a broadcast mode is retained.

FIG. 33(d) illustrates an MPU (broadcasting MPU) received by the receiver 200A by a rectangular frame. This MPU is in a state delayed by one second due to the delay of the encode buffer, for example. Furthermore, FIG. 33(e) illustrates a leap second control signal (leap_control) as identification information corresponding to each of the received MPUs. This leap second control signal is "101" in the first MPU referring to the absolute time information after occurrence of a leap second and then turns "111" in other MPUs.

FIG. 33(f) illustrates absolute time information in a clock of the distribution device 100C. In this case, insertion of a leap second is shifted from original "8:59:59" to "2:59:59" in the midnight. FIG. 33(g) illustrates an MPU (network distribution MPU) received by the receiver 200A by a rectangular frame. This MPU is in a state delayed by one second due to the delay of the encode buffer, for example.

FIG. 33(h) illustrates a leap second control signal (leap_control) as time difference information corresponding to each of the MPUs received. Regarding absolute time information in the clock of the broadcasting sending system 100A (see FIG. 33(a)) and absolute time information in the clock of the distribution device 100C (see FIG. 33(f)), absolute time information in the clock of the distribution device 100C is advanced by just one second from absolute time information in the clock of the broadcasting sending system 100A during a period from "9:00:00" to the first "2:59:59" in the absolute time information in the clock of the distribution device 100C.

Therefore, a leap second control signal (leap_control) as time difference information in FIG. 33(h) is turned to "001" in MPUs corresponding to the period while turned to "011" in other MPUs (see FIG. 26). Therefore, the receiver 200A can perform presentation synchronization of transmission media from both of the broadcasting sending system 100A and the distribution device 100C by adjusting presentation time of each presentation unit group of transmission media from the distribution device 100C on the basis of the leap second control signal (leap_control) as time difference information.

FIGS. 34(a) to 34(h) illustrate exemplary presentation synchronization processing in multistream service 1 in a case where a leap second is deleted. In the case of this example, a broadcasting stream is based on the leap second shift mode while a network distribution stream is based on a normal leap second.

FIG. 34(a) illustrates absolute time information in a clock of the broadcasting sending system 100A. In this case, deletion of a leap second is shifted from original "8:59:59" to "2:59:59" in the midnight. FIG. 34(c) illustrates a value of a leap second indicator (leap_indicator). In this case, the leap second indicator is "10" until "3:00:00" when deletion of a leap second is terminated and turns "00" thereafter.

FIG. 34(b) illustrates an NIP operation mode. In this example, the broadcast leap second shift mode is changed to the broadcast mode one second prior to deletion time of a leap second after shifting. In this case, the reception side can recognize the shifted timed of the leap second in advance by one second.

FIG. 34(d) illustrates an MPU (broadcasting MPU) received by the receiver 200A by a rectangular frame. This MPU is in a state delayed by one second due to the delay of the encode buffer, for example. Furthermore, FIG. 34(e) illustrates a leap second control signal (leap_control) as identification information corresponding to each of the received MPUs. This leap second control signal is "110" in the first MPU referring to the absolute time information after occurrence of a leap second and then turns "111" in other MPUs.

FIG. 34(f) illustrates absolute time information in a clock of the distribution device 100C. In this case, deletion of a leap second is performed at original "8:59:59". FIG. 34(g) illustrates an MPU (network distribution MPU) received by the receiver 200A by a rectangular frame. This MPU is in a state delayed by one second due to the delay of the encode buffer, for example.

FIG. 34(h) illustrates a leap second control signal (leap_control) as time difference information corresponding to each of the received MPUs. Regarding absolute time information in the clock of the broadcasting sending system 100A (see FIG. 34(a)) and absolute time information in the clock of the distribution device 100C (see FIG. 34(f)), absolute time information in the clock of the distribution device 100C is advanced by just one second from absolute time information in the clock of the broadcasting sending system 100A during a period from the second "8:59:59" to "2:59:58" related to insertion of a leap second in the absolute time information in the clock of the distribution device 100C.

Therefore, a leap second control signal (leap_control) as time difference information in FIG. 34(h) is turned to "001" in MPUs corresponding to the period while turned to "011" in other MPUs (see FIG. 26). Therefore, the receiver 200A can perform presentation synchronization of transmission media from both of the broadcasting sending system 100A and the distribution device 100C by adjusting presentation time of each presentation unit group of transmission media from the distribution device 100C on the basis of the leap second control signal (leap_control) as time difference information.

FIGS. 35(a) to 35(h) illustrate exemplary presentation synchronization processing in multistream service 2 in a case where a leap second is deleted. In the case of this example, a broadcasting stream is based on a normal leap second while a network distribution stream is based on the leap second shift mode.

FIG. 35(a) illustrates absolute time information in a clock of the broadcasting sending system 100A. In this case, insertion of a leap second is performed at original "8:59:59". FIG. 35(c) illustrates a value of a leap second indicator (leap_indicator). In this case, the leap second indicator is "10" until "9:00:00" when deletion of a leap second is terminated and turns "00" thereafter. FIG. 35(b) illustrates an NTP operation mode. In this example, a broadcast mode is retained.

FIG. 35(d) illustrates an MPU (broadcasting MPU) received by the receiver 200A by a rectangular frame. This MPU is in a state delayed by one second due to the delay of the encode buffer, for example. Furthermore, FIG. 35(e) illustrates a leap second control signal (leap_control) as identification information corresponding to each of the received MPUs. This leap second control signal is "110" in the first MPU referring to the absolute time information after occurrence of a leap second and then turns "111" in other MPUs.

FIG. 35(f) illustrates absolute time information in a clock of the distribution device 100C. In this case, deletion of a leap second is shifted from original "8:59:59" to "2:59:59" in the midnight. FIG. 35(g) illustrates an MPU (network distribution MPU) received by the receiver 200A by a rectangular frame. This MPU is in a state delayed by one second due to the delay of the encode buffer, for example.

FIG. 35(h) illustrates a leap second control signal (leap_control) as time difference information corresponding to each of the received MPUs. Regarding absolute time information in the clock of the broadcasting sending system 100A (see FIG. 35(a)) and absolute time information in the clock of the distribution device 100C (see FIG. 35(f)), absolute time information in the clock of the distribution device 100C is delayed by just one second from absolute time information in the clock of the broadcasting sending system 100A during a period from "9:00:00" to "2:59:58" in the absolute time information in the clock of the distribution device 100C.

Therefore, a leap second control signal (leap_control) as time difference information in FIG. 35(h) is turned to "010" in MPUs corresponding to the period while turned to "011" in other MPUs (see FIG. 26). Therefore, the receiver 200A can perform presentation synchronization of transmission media from both of the broadcasting sending system 100A and the distribution device 100C by adjusting presentation time of each presentation unit group of transmission media from the distribution device 100C on the basis of the leap second control signal (leap_control) as time difference information.

As described above, with respect to the broadcasting sending system 100B and the distribution device 100C in the transmission/reception system 10A illustrated in FIG. 31, time difference information representing time difference, of the absolute time information referred to when presentation time of each presentation unit group is generated, from absolute time information in the broadcasting sending system 100A, is transmitted together with the transmission media. This allows the reception side to adjust the presentation time of each presentation unit group of the transmission media on the basis of the time difference information and to process the transmission media on the basis of the absolute time information synchronized with the absolute time information from the broadcasting sending system 100A in a preferable manner.

<3. Variation>

Note that, in the embodiment described above, the example of dealing a broadcasting stream of the MMT system has been described. Although detailed descriptions are omitted, the present technology is surely applicable to a case of dealing a similar broadcasting stream in a similar manner.

Moreover, the present technology may employ configurations as follows.

(1) A transmission apparatus, including:

a time information generating unit which generates absolute time information synchronized with absolute time information acquired from an external source, the time information generating unit generating time information by shifting, to shifted time, occurrence time of a leap second that can be represented by the absolute time information acquired from the external source; and a transmission unit which transmits a signal including transmission media and the absolute time information generated by the time information generating unit.

(2) The transmission apparatus according to (1), in which, when occurrence time of the leap second is in a shifted state, the absolute time information generated by the time information generating unit is added with mode information representing as being in the state.

(3) The transmission apparatus according to (2), in which the mode information is modified to represent as being in a normal state a certain period of time prior to the shifted time.

(4) The transmission apparatus according to any one of (1) to (3), in which the signal is a broadcasting signal transmitted using a broadcasting transmission path or a distribution signal transmitted using a communication transmission path.

(5) A transmission method, including:

a time information generating step of generating absolute time information synchronized with absolute time information acquired from an external source, the time information generated by shifting, to shifted time, occurrence time of a leap second that can be represented by the absolute time information acquired from the external source; and a transmission step of transmitting, by a transmission unit, a signal including transmission media and the absolute time information generated in the time information generating step.

(6) A reception apparatus, including:

a reception unit which receives a signal including transmission media and absolute time information;

a time information generating unit which generates absolute time information synchronized with the absolute time information included in the signal received by the reception unit; and a processing unit which processes the transmission media on the basis of the absolute time information generated by the time information generating unit, in which, when occurrence time of a leap second is in a shifted state, the absolute time information included in the signal received by the reception unit is added with mode information representing as being in this state, the mode information is modified to represent as being in a normal state a certain period of time prior to the shifted time, and the time information generating unit generates the leap second at the shifted time on the basis of the mode information.

(7) A reception method, including:

a reception step of receiving, by a reception unit, a signal including transmission media and absolute time information;

a time information generating step of generating absolute time information synchronized with the absolute time information included in the signal received in the reception step; and a processing step of processing the transmission media on the basis of the absolute time information generated in the time information generating step, in which, when occurrence time of a leap second is in a shifted state, the absolute time information included in the signal received in the reception step is added with mode information representing as being in this state, the mode information is modified to represent as being in a normal state a certain period of time prior to the shifted time, and in the time information generating step, the leap second is generated at the shifted time on the basis of the mode information.

(8) A transmission apparatus, including: a time information generating unit which generates absolute time information synchronized with absolute time information acquired from an external source;

a presentation time generating unit which generates presentation time of each presentation unit group formed by a predetermined number of presentation units of transmission media on the basis of the absolute time information generated by the time information generating unit;

an identification information generating unit which generates identification information identifying the first presentation unit group referring to absolute time information after occurrence of a leap second when the leap second occurs in the absolute time information generated by the time information generating unit; and a transmission unit which transmits a signal including the transmission media, the absolute time information generated by the time information generating unit, presentation time of each presentation unit group generated by the presentation time generating unit, and the identification information generated by the identification information generating unit.

(9) The transmission apparatus according to (8), in which the signal includes a first packet including the transmission media, a second packet including information related to the transmission media, and a third packet including the absolute time information, and presentation time of each presentation unit group and the identification information are inserted in the second packet.

(10) The transmission apparatus according to (8) or (9), in which the signal is a broadcasting signal transmitted using a broadcasting transmission path or a distribution signal transmitted using a communication transmission path.

(11) A transmission method, including:

a time information generating step of generating absolute time information synchronized with absolute time information acquired from an external source;

a presentation time generating step of generating presentation time of each presentation unit group formed by a predetermined number of presentation units of transmission media on the basis of the absolute time information generated in the time information generating step;

an identification information generating step of generating identification information identifying the first presentation unit group referring to absolute time information after occurrence of a leap second when the leap second occurs in the absolute time information generated in the time information generating step; and a transmission step of transmitting, by a transmission unit, a signal including the transmission media, the absolute time information generated in the time information generating step, presentation time of each presentation unit group generated in the presentation time generating step, and the identification information generated in the identification information generating step.

(12) A reception apparatus, including: a reception unit which receives a signal including transmission media, absolute time information, presentation time of each presentation unit group formed by a predetermined number of presentation units of the transmission media, and identification information identifying the first presentation unit group referring to absolute time information after occurrence of a leap second when the leap second occurs in the absolute time information;

a time information generating unit which generates absolute time information synchronized with the absolute time information included in the signal received by the reception unit, the time information generating unit generating the absolute time information on a continuous time axis even at the occurrence time of the leap second in the absolute time information;

a presentation time adjusting unit which, out of presentation time of each presentation unit group included in the signal received by the reception unit, adjusts presentation time of each presentation unit group from and after a presentation unit group specified by the identification information included in the signal received by the reception unit; and a processing unit which processes the transmission media on the basis of the absolute time information generated by the time information generating unit and presentation time of each presentation unit group adjusted by the presentation time adjusting unit.

(13) The reception apparatus according to (12), in which the presentation time adjusting unit adds one second to each presentation time when occurrence of the leap second is insertion of the leap second and subtracts one second from each presentation time when occurrence of the leap second is deletion of the leap second.

(14) A reception method, including:

a reception step of receiving, by a reception unit, a signal including transmission media, absolute time information, presentation time of each presentation unit group formed by a predetermined number of presentation units of the transmission media, and identification information identifying the first presentation unit group referring to absolute time information after occurrence of a leap second when the leap second occurs in the absolute time information;

a time information generating step of generating absolute time information synchronized with the absolute time information included in the signal received in the reception step, the absolute time information generated on a continuous time axis even at the occurrence time of the leap second in the absolute time information;

a presentation time adjusting step of adjusting, out of presentation time of each presentation unit group included in the signal received in the reception step, presentation time of each presentation unit group from and after a presentation unit group specified by the identification information included in the signal received in the reception step; and a processing step of processing the transmission media on the basis of the absolute time information generated in the time information generating step and presentation time of each presentation unit group adjusted in the presentation time adjusting step.

(15) A transmission apparatus, including:

a time information generating unit which generates absolute time information synchronized with absolute time information acquired from an external source;

a presentation time generating unit which generates presentation time of each presentation unit group formed by a predetermined number of presentation units of transmission media on the basis of the absolute time information generated by the time information generating unit;

a time difference information generating unit which generates time difference information representing time difference, of the absolute time information generated by the time information generating unit referred to when presentation time of each presentation unit group is generated by the presentation time generating unit, from absolute time information in another transmission device; and a transmission unit which transmits a signal including the transmission media, presentation time of each presentation unit group generated by the presentation time generating unit, and the time difference information of each presentation unit group generated by the time difference information generating unit.

(16) The transmission apparatus according to (15), in which the signal includes a first packet including the transmission media and a second packet including information related to the transmission media, and presentation time of each presentation unit group and the time difference information of each presentation unit group are inserted in the second packet.

(17) The transmission apparatus according to (15) or (16), in which the signal is a broadcasting signal transmitted using a broadcasting transmission path or a distribution signal transmitted using a communication transmission path.

(18) A transmission method, including:

a time information generating step of generating absolute time information synchronized with absolute time information acquired from an external source;

a presentation time generating step of generating presentation time of each presentation unit group formed by a predetermined number of presentation units of transmission media on the basis of the absolute time information generated in the time information generating step;

a time difference information generating step of generating time difference information representing time difference, of the absolute time information generated in the time information generating step referred to when presentation time of each presentation unit group is generated in the presentation time generating step, from absolute time information in another transmission device; and a transmission step of transmitting, by a transmission unit, a signal including the transmission media, presentation time of each presentation unit group generated in the presentation time generating step, and the time difference information of each presentation unit group generated in the time difference information generating step.

(19) A reception apparatus, including:

a reception unit which receives a first signal from a first transmission device and a second signal from a second transmission device, the first signal including first transmission media, absolute time information, and first presentation time of each presentation unit group formed by a predetermined number of presentation units of the first transmission media, and the second signal including second transmission media and second presentation time and time difference information for each presentation unit group formed by a predetermined number of presentation units of the second transmission media;

a time information generating unit which generates absolute time information synchronized with the absolute time information included in the first signal;

a presentation time adjusting unit which adjusts the second presentation time of each presentation unit group of the second transmission media included in the second signal on the basis of the time difference information included in the second signal; and a processing unit which processes the first transmission media on the basis of the absolute time information generated by the time information generating unit and the first presentation time of each presentation unit group of the first transmission media included in the first signal and processes the second transmission media on the basis of the absolute time information generated by the time information generating unit and the second presentation time of each presentation unit group of the second transmission media adjusted by the time information adjusting unit.

(20) A reception method, including:

a reception step of receiving, by a reception unit, a first signal from a first transmission device and a second signal from a second transmission device, the first signal including first transmission media, absolute time information, and first presentation time of each presentation unit group formed by a predetermined number of presentation units of the first transmission media, and the second signal including second transmission media and second presentation time and time difference information for each presentation unit group formed by a predetermined number of presentation units of the second transmission media;

a time information generating step of generating absolute time information synchronized with the absolute time information included in the first signal;

a presentation time adjusting step of adjusting the second presentation time of each presentation unit group of the second transmission media included in the second signal on the basis of the time difference information included in the second signal; and a processing step of processing the first transmission media on the basis of the absolute time information generated in the time information generating step and the first presentation time of each presentation unit group of the first transmission media included in the first signal and processing the second transmission media on the basis of the absolute time information generated in the time information generating step and the second presentation time of each presentation unit group of the second transmission media adjusted in the time information adjusting step.

A major feature of the present technology is that influence on a reception side due to occurrence of a leap second is suppressed by shifting occurrence time of a leap second to shifted time in absolute time information transmitted together with transmission media (see FIGS. 23(a) to 23(d) and 24(a) to 24(d)). Furthermore, another major feature of the present technology is that influence by occurrence of a leap second can be suppressed by transmitting identification information identifying the first presentation unit group referring to absolute time information after occurrence of a leap second together with transmission media and by adjusting presentation time of each presentation unit group of the transmission media on a reception side on the basis of this identification information (see FIGS. 27(a) to 27(g) and 28(a) to 28(g)).

REFERENCE SIGNS LIST 10, 10A Transmission/reception system
100, 100A, 100B Broadcasting sending system
100C Distribution device
151A, 151B, 151C Clock unit (time information generating unit)
152A, 152B.152C Video/audio encoder
153A, 153B Sending device
153C Real-time distribution server
111 NTP clock generating unit
112 Signal sending unit
113 Video encoder
114 Audio encoder
115 MMT signaling encoding unit
116 TLV signaling generating unit
117-1 to 117-N IP service multiplexer
118 TLV multiplexer
119 Modulation/transmission unit
200 Receiver
201, 200A Tuner/demodulation unit
202 Demultiplexer
202a MMT-SI filter unit
202b TLV-SI filter unit
203 NTP clock reproducing unit
204 System control unit
205 Video control unit
206 Video decode buffer
207 Video decoder 208 Audio control unit
209 Audio decode buffer
210 Audio decoder

The invention claimed is:

1. A transmission apparatus, comprising:
circuitry configured to
generate absolute time information synchronized with absolute time information acquired from an external source,
generate presentation time of each presentation unit group formed by a predetermined number of presentation units of transmission media on the basis of the absolute time information,
generate identification information identifying the first presentation unit group referring to absolute time information after occurrence of a leap second when the leap second occurs in the absolute time information, the identification information including an indication of a shift time interval based on the leap second occurrence, and
transmit a signal including the transmission media, the absolute time information, presentation time of each presentation unit group, and the identification information.

2. The transmission apparatus according to claim 1, wherein the signal includes a first packet including the transmission media, a second packet including information related to the transmission media, and a third packet including the absolute time information, and
the presentation time and the identification information of each presentation unit group are inserted in the second packet.

3. The transmission apparatus according to claim 1, wherein the signal is a broadcasting signal transmitted using a broadcasting transmission path or a distribution signal transmitted using a communication transmission path.

4. A transmission method, comprising:
generating absolute time information synchronized with absolute time information acquired from an external source;
generating presentation time of each presentation unit group formed by a predetermined number of presentation units of transmission media on the basis of the absolute time information;
generating identification information identifying the first presentation unit group referring to absolute time information after occurrence of a leap second when the leap second occurs in the absolute time information, the identification information including an indication of a shift time interval based on the leap second occurrence; and
transmitting a signal including the transmission media, the absolute time information, presentation time of each presentation unit group, and the identification information.

5. A reception apparatus, comprising:
circuitry configured to
receive a signal including transmission media, absolute time information, presentation time of each presentation unit group formed by a predetermined number of presentation units of the transmission media, and identification information identifying the first presentation unit group referring to absolute time information after occurrence of a leap second when the leap second occurs in the absolute time information, the identification information including an indication of a shift time interval based on the leap second occurrence;
generate absolute time information synchronized with the absolute time information included in the signal;
adjust presentation time of each presentation unit group from and after a presentation unit group specified by the identification information included in the signal; and
process the transmission media on the basis of the absolute time information and presentation time of each presentation unit group.

6. The reception apparatus according to claim 5, wherein the presentation time adjusting unit adds one second to each presentation time when occurrence of the leap second is insertion of the leap second and subtracts one second from each presentation time when occurrence of the leap second is deletion of the leap second.

7. A reception method, comprising:
receiving, by circuitry, a signal including transmission media, absolute time information, presentation time of each presentation unit group formed by a predetermined number of presentation units of the transmission media, and identification information identifying the first presentation unit group referring to absolute time information after occurrence of a leap second when the leap second occurs in the absolute time information, the identification information including an indication of a shift time interval based on the leap second occurrence;
generating absolute time information synchronized with the absolute time information included in the signal;
adjusting presentation time of each presentation unit group from and after a presentation unit group specified by the identification information included in the signal; and
processing the transmission media on the basis of the absolute time information and presentation time of each presentation unit group.

8. The transmission apparatus of claim 1, wherein the shift time interval is a time interval in which transmission of a type of broadcast is shifted to a predetermined transmission time, the predetermined transmission time being indicative of a desired transmission traffic level.

* * * * *